(12) United States Patent
Liu et al.

(10) Patent No.: US 12,350,218 B2
(45) Date of Patent: Jul. 8, 2025

(54) SYSTEM, APPARATUS, AND METHOD FOR BROADCASTING CONTENT

(71) Applicant: HYTTO PTE. LTD, Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/903,557

(22) Filed: Oct. 1, 2024

(65) Prior Publication Data
US 2025/0017812 A1    Jan. 16, 2025

Related U.S. Application Data

(63) Continuation of application No. 18/371,716, filed on Sep. 22, 2023, which is a continuation of application
(Continued)

(51) Int. Cl.
| | |
|---|---|
| H04N 23/661 | (2023.01) |
| A61H 19/00 | (2006.01) |
| G06Q 20/10 | (2012.01) |
| G06Q 50/00 | (2012.01) |
| H04L 65/61 | (2022.01) |
| H04L 67/125 | (2022.01) |
| H04N 5/268 | (2006.01) |
| H04N 7/14 | (2006.01) |
| H04N 21/4223 | (2011.01) |

(Continued)

(52) U.S. Cl.
CPC ............. *A61H 19/00* (2013.01); *G06Q 20/10* (2013.01); *G06Q 50/01* (2013.01); *H04L 65/61* (2022.05); *H04L 67/125* (2013.01); *H04N 5/268* (2013.01); *H04N 7/141* (2013.01); *H04N 21/4223* (2013.01); *H04N 21/472* (2013.01); *H04N 21/4854* (2013.01); *H04N 23/661* (2023.01); *H04N 23/695* (2023.01);
(Continued)

(58) Field of Classification Search
CPC ........... A61H 19/00; A61H 2201/5012; G06Q 20/10; G06Q 50/01; H04L 65/61; H04L 67/125; H04N 5/268; H04N 7/141; H04N 21/4223; H04N 21/472; H04N 21/4854; H04N 23/661; H04N 23/695; H04N 23/698; H04N 23/555; H04N 23/61
See application file for complete search history.

(56) References Cited

U.S. PATENT DOCUMENTS

| | | |
|---|---|---|
| 6,368,268 B1 | 4/2002 | Sandvick et al. |
| 9,762,515 B1 * | 9/2017 | Olivares ................. G06Q 20/18 |

(Continued)

FOREIGN PATENT DOCUMENTS

WO    WO-2016170440 A1 * 10/2016  ............. A61H 19/30

*Primary Examiner* — John R Schnurr
(74) *Attorney, Agent, or Firm* — Holtz, Holtz & Volek PC

(57) ABSTRACT

A system has an imaging device configured to obtain broadcast content of a streamer, one or more viewer devices configured to directly or indirectly control the imaging device, a streamer device configured to stream the broadcast content to the one or more viewer devices, and a control module associated with the imaging device. The imaging device, the one or more viewer devices, the streamer device, and the control module are configured to receive one or more input data from the one or more viewer devices, convert the one or more input data into one or more control instructions, and in response to the one or more control instructions, use the control module to control the imaging device to perform one or more imaging functions.

18 Claims, 21 Drawing Sheets

Related U.S. Application Data

No. 17/930,805, filed on Sep. 9, 2022, now Pat. No. 11,800,191.

(51) Int. Cl.
  *H04N 21/472* (2011.01)
  *H04N 21/485* (2011.01)
  *H04N 23/695* (2023.01)
  *H04N 23/698* (2023.01)
  *H04N 23/50* (2023.01)
  *H04N 23/61* (2023.01)

(52) U.S. Cl.
  CPC ... *H04N 23/698* (2023.01); *A61H 2201/5012* (2013.01); *H04N 23/555* (2023.01); *H04N 23/61* (2023.01)

(56) References Cited

U.S. PATENT DOCUMENTS

| | | | |
|---|---|---|---|
| 10,846,388 B2 | 11/2020 | Yin et al. | |
| 10,891,755 B2 | 1/2021 | Liu | |
| 11,800,191 B1* | 10/2023 | Liu | H04N 21/472 |
| 2009/0167867 A1 | 7/2009 | Lin et al. | |
| 2015/0229695 A1* | 8/2015 | Kim | H04L 65/70 |
| | | | 709/219 |
| 2015/0366748 A1 | 12/2015 | Cambridge | |
| 2017/0339391 A1 | 11/2017 | Zhou et al. | |
| 2020/0311968 A1 | 10/2020 | Liu | |
| 2020/0314464 A1 | 10/2020 | Liu | |
| 2022/0266155 A1 | 8/2022 | Kaszaly | |
| 2022/0337910 A1 | 10/2022 | Delgado | |

* cited by examiner

SYSTEM, APPARATUS, AND METHOD FOR BROADCASTING CONTENT

CROSS REFERENCE TO RELATED APPLICATION

This application is a continuation of U.S. patent application Ser. No. 18/371,716, filed on Sep. 22, 2023, which is a continuation of U.S. patent application Ser. No. 17/930,805, filed on Sep. 9, 2022, and issued as U.S. Pat. No. 11,800,191 on Oct. 24, 2023, the entire contents of all of which are hereby incorporated by reference as if fully set forth herein.

FIELD OF THE INVENTION

The present disclosure generally relates to a system, apparatus, and method for broadcasting, and more particularly to a system, apparatus, and method for broadcasting content.

BACKGROUND OF THE INVENTION

Conventional live broadcasting typically involves a streamer's device that streams broadcast content to multiple viewer devices. The viewers can enjoy watching a show broadcast by the streamer in real time and may interact with the streamer by sending tips, gifts, or messages.

One or more users may interact with models that stream content. However, conventional systems typically involve static imaging devices such as static cameras. Accordingly, conventional systems do not adequately provide for effective control of an imaging device that may be imaging a model during broadcasting.

Accordingly, a need in the art exists for an efficient technique for controlling imaging devices that image models during broadcasting.

The exemplary disclosed system and method are directed to overcoming one or more of the shortcomings set forth above and/or other deficiencies in existing technology.

SUMMARY OF THE INVENTION

In one exemplary aspect, the present disclosure is directed to a system. The system includes an imaging device configured to obtain broadcast content of a streamer, one or more viewer devices configured to directly or indirectly control the imaging device, a streamer device configured to stream the broadcast content to the one or more viewer devices, a control module associated with the imaging device, the control module configured to communicate with the streamer device or the one or more viewer devices, and the control module comprising computer-executable code stored in non-volatile memory, and a processor. The imaging device, the one or more viewer devices, the streamer device, the control module, and the processor are configured to receive one or more input data from the one or more viewer devices, convert the one or more input data into one or more control instructions, and in response to the one or more control instructions, use the control module to control the imaging device to perform one or more imaging functions.

In another aspect, the present disclosure is directed to a method. The method includes providing an imaging device, obtaining broadcast content of a streamer using the imaging device, directly or indirectly controlling the imaging device using one or more viewer devices, streaming the broadcast content to the one or more viewer devices using a streamer device, receiving one or more input data from the one or more viewer devices, converting the one or more input data into one or more control instructions, and in response to the one or more control instructions, controlling the imaging device to perform one or more imaging functions.

DETAILED DESCRIPTION AND INDUSTRIAL APPLICABILITY

Figure 1:
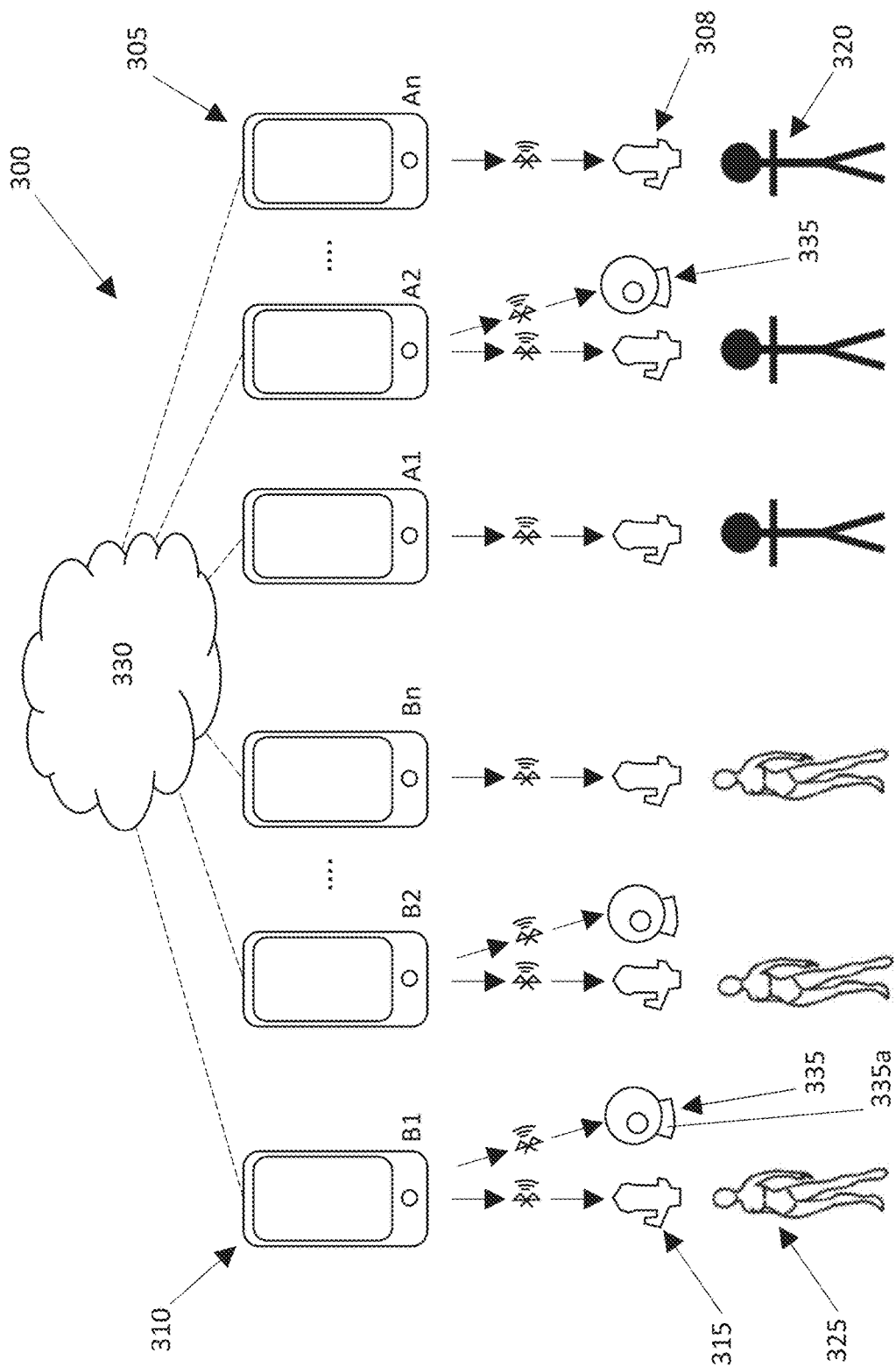
FIG. 1 is a schematic illustration of an exemplary system of the present invention.

FIG. 1 illustrates an exemplary system 300 for controlling devices. In at least some exemplary embodiments, the exemplary disclosed system, apparatus, and method may include a non-transitory storage medium for controlling a camera during broadcasting (e.g., in real-time or near real-time). In at least some exemplary embodiments, system 300 may be a system for controlling an imaging device in real-time (e.g., in real-time or in near real-time) for an adult entertainment application. In at least some exemplary embodiments, system 300 may include an imaging device such as a camera including an actuator that may image a model. The imaging device may also image a smart sex toy that may be remotely controlled, for example, by a user viewing a model operating the smart sex toy.

In at least some exemplary embodiments, system 300 may allow for one or more users to interact with models (e.g., models being imaged during broadcasting) from a certain distance, for example, by allowing one or more viewers to tip one or more models during broadcasting (e.g., online video chat sessions). The models may define tipping parameters for performing predefined acts, via an adult toy, based on the amount of tips received. The exemplary disclosed adult toy may be Wi-Fi or Bluetooth enabled to receive commands directly from a server via a web browser extension, a website hosting an online video chat session, and/or connect to an application installed on a model device operated by the model. The exemplary disclosed application may communicate with the web browser extension to relay commands to the adult toy therefrom. The browser extension and/or website may generate live control links to allow certain users to control (e.g., to maintain a live control) of the model's adult toy.

As illustrated in FIG. 1, system 300 may include one or more user devices 305, one or more model devices 310, one or more viewer accessories 308, and one or more model accessories 315. For example, system 300 may include a plurality of user devices 305, a plurality of viewer accessories 308, a plurality of model devices 310, and a plurality of model accessories 315. Data such as image data, audio data, and/or control data may be transferred between user devices 305, viewer accessories 308, model devices 310, and model accessories 315.

As illustrated in FIG. 1, system 300 may include any desired number of user devices 305 (e.g., A1, A2, ... An). User device 305 may be any suitable device for interfacing with other components of system 300 such as a computing device (e.g., user interface). For example, user device 305 may be any suitable user interface for receiving input and/or providing output (e.g., image data) to a user 320. User device 305 may include a camera and a microphone. User device 305 may be, for example, a touchscreen device (e.g., of a smartphone, a tablet, a computer, a smartboard, a virtual reality device, and/or any suitable computer device), a wearable device, a computer keyboard and monitor (e.g., a desktop or laptop), an audio-based device for entering input and/or receiving output via sound, a tactile-based device for entering input and receiving output based on touch or feel, a dedicated user interface designed to work specifically with other components of system 300, and/or any other suitable user interface (e.g., including components and/or configured to work with components described below regarding FIGS. 14 and 15). For example, user device 305 may include a touchscreen device of a smartphone or handheld tablet. For example, user device 305 may include a display (e.g., a computing device display, a touchscreen display, and/or any other suitable type of display) that may provide output, image data, and/or any other desired output or input prompt to a user. For example, the exemplary display may include a graphical user interface to facilitate entry of input by a user and/or receiving output such as image data. An application for example as described herein and/or a web browser may be installed on user device 305 and utilized by user 320. User device 305 may include storage for example as described regarding FIG. 14. For example, user device 305 may have storage for storing programming instructions for example as described below.

Figure 2:
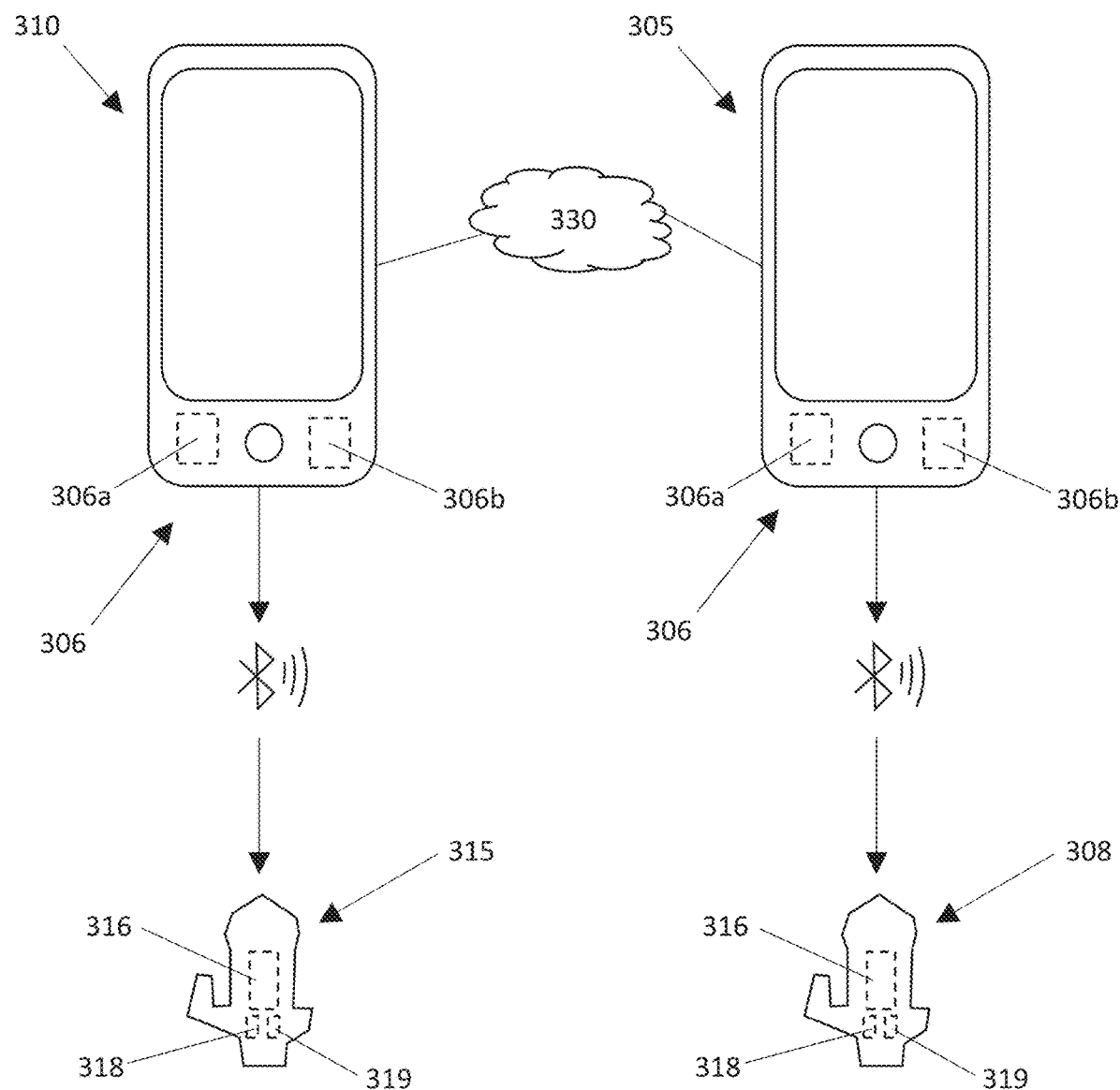
FIG. 2 is a schematic illustration of an exemplary system of the present invention.

As illustrated in FIG. 2, user device 305 may include a sensor array 306. In at least some exemplary embodiments, sensor array 306 may include one or more sensors integrated or built into the exemplary disclosed user device (e.g., user device 305) such as, for example, a mobile phone, a pad, or a wearable device. Sensor array 306 may include any suitable sensors for use with system 300 such as, for example, a location sensor 306a and a movement sensor 306b. Location sensor 306a may include a GPS device, a Galileo device, a GLONASS device, an IRNSS device, a BeiDou device, and/or any other suitable device that may operate with a global navigation system.

Movement sensor 306b may include any suitable components for sensing motion (e.g., motion amplitude), velocity, and/or acceleration. Movement sensor 306b may include an acceleration sensor. Movement sensor 306b may include a gyroscope. For example, movement sensor 306b may include a displacement sensor, a velocity sensor, and/or an accelerometer. For example, movement sensor 306b may include components such as a servo accelerometer, a piezoelectric accelerometer, a potentiometric accelerometer, and/or a strain gauge accelerometer. Movement sensor 306b may include a piezoelectric velocity sensor or any other suitable type of velocity or acceleration sensor.

System 300 may include any desired number of model devices 310 (e.g., B1, B2, ... Bn). Model device 310 may be similar to user device 305. For example, model device 310 may be any suitable user interface for receiving input and/or providing output (e.g., image data) to a streamer such as a model 325. Model 325 (e.g., a specific user) may operate model device 310 (e.g., a specific user device) to record and transfer image (e.g., video) and audio data to one or more users 320 via a network 330.

Model accessory 315 may be any suitable accessory for use by model 325 (e.g., when model 325 is imaged by model device 310). For example, model accessory 315 may be a prop that is used by model 325 while model 325 is being imaged (e.g., a video or pictures of model 325 are being recorded and/or transmitted in real-time to be viewed by user 320). For example, model accessory 315 may be a device used for erotic stimulation (e.g., a sex aid or a "sex toy"). Model accessory 315 may be a sexual simulation device that may be associated with a given model 325 (e.g., a specific user) and respective model device 310 (e.g., a streamer device such as a specific user device) of that given model 325. In at least some exemplary embodiments, model accessory 315 may be a massaging apparatus for human genitalia (e.g., a vibrator). For example, model accessory 315 may be any suitable device for use in a video or pictures recorded by model device 310, which may be an erotic video or erotic pictures). In at least some exemplary embodiments, model accessory 315 may be a tool or other indicator that may be used in video or pictures recorded by model device 310 such as surveying equipment, a sign providing information such as location or time information, a surveillance tool used by model 325, and/or any other suitable tool or accessory that may be used while model device 310 is recording a video or pictures of model 325. For example, model 325 may be an erotic model using model accessory 315 that may be an erotic device, a technician or laborer using model accessory 315 that may be a tool or work device specific to a desired application, an operative using model accessory 315 that may be a surveillance tool or a part of a weapon system being recorded by model device 310, and/or any other desired role using any suitable model accessory 315.

Model accessory 315 may include a motor 316. Motor 316 may include an electric motor. Motor 316 may include a server motor, a stepper motor, a brushless motor, or any other suitable type of motor. Motor 316 may include any suitable vibration motor or haptic motor such as, for example, a mini vibrator motor. Motor 316 may include a low voltage motor. Motor 316 may include a pager motor or a coin vibration motor. Motor 316 may include a linear resonant actuator or an eccentric rotating mass vibration motor. Motor 316 may be powered by any suitable power source, such as a battery (e.g., a nickel-metal hydride battery, a lithium-ion battery, an ultracapacitor battery, a lead-acid battery, and/or a nickel cadmium battery), an electric power source (e.g., a transformer connected to a plug that may plug into an outlet), and/or any other suitable energy source. Model accessory 315 may include a controller 319 that may be any suitable computing device for controlling an operation of motor 316 and a communication device 318. Controller 319 may, for example, include components similar to the components described below regarding FIG. 14. Controller 319 may include for example a processor (e.g., micro-processing logic control device) or board components. Controller 319 may control motor 316 based on input data and/or commands received from user device 305 and/or model device 310 via network 330 and/or a communication device 318 (e.g., transferred directly to communication device 318 by any suitable component of system 300). Motor 316 may be controlled by controller 319 to vibrate model accessory 315 at a desired level or strength, perform a suction operation at a desired level or strength using model accessory 315 (e.g., using model accessory 315 as a suction device), rotate or swing model accessory 315 at a desired speed or amount, contract or expand model accessory 315 by a desired amount, cause model accessory 315 to perform an inhalation action, and/or cause model accessory 315 to perform any other suitable action or function. Controller 319 may include storage for example as described regarding FIG. 14. For example, controller 319 may have storage for storing programming instructions for example as described below.

In at least some exemplary embodiments, motor 316 may be or may include a thermal device such as a heater. In at least some exemplary embodiments, motor 316 may include an electric heating device such as an electric resistance heating device. Motor 316 may include a polyimide heater, a silicone rubber heater, and/or a resistive wire heater. Motor 316 may be controlled by controller 319 to heat or emit heat or warmth from model accessory 315. For example, motor 316 may cause a temperature variation of model accessory 315.

Viewer accessory 308 may be similar to model accessory 315. Viewer accessory 308 may be a sexual simulation device that may be associated with a given user 320 (e.g., a viewer of one or more models 325) and respective user device 305 (e.g., a viewer device) of that given user 320.

Network 330 may be any suitable communication network over which data may be transferred between one or more user devices 305, one or more viewer accessories 308, one or more model devices 310, and/or one or more model accessories 315. Network 330 may be the internet, a LAN (e.g., via Ethernet LAN), a WAN, a WiFi network, or any other suitable network. Network 330 may be similar to WAN 201 described below. The components of system 300 may also be directly connected (e.g., by wire, cable, USB connection, and/or any other suitable electro-mechanical connection) to each other and/or connected via network 330. For example, components of system 300 may wirelessly transmit data by any suitable technique such as, e.g., wirelessly transmitting data via 4G LTE networks (e.g., or 5G networks) or any other suitable data transmission technique for example via network communication. Components of system 300 may transfer data via the exemplary techniques described below regarding FIG. 15. User devices 305, viewer accessories 308, model devices 310, and/or model accessories 315 may include any suitable communication components for communicating with other components of system 300 using for example the communication techniques described above. For example, user devices 305 and model devices 310 may include integrally formed communication devices (e.g., smartphone components), and viewer accessories 308 and model accessories 315 may each include communication device 318 that may communicate using any of the exemplary disclosed communication techniques.

In at least some exemplary embodiments, a given model accessory 315 may communicate with a given model device 310 (e.g., a paired model device 310) via any suitable short distance communication technique. For example, model accessories 315 (e.g., via communication device 318) and model devices 310 may communicate via Wifi, Bluetooth, ZigBee, NFC, IrDA, and/or any other suitable short distance technique. Model accessory 315 may be an adult toy that may be connected with model device 310 through short distance wireless communication. An application (e.g., operating using the exemplary disclosed modules) may be installed on model device 310, the application and model device 310 being configured to send commands to model accessory 315 to drive (e.g., actuate) model accessory 315. Viewer accessory 308 may communicate with user device 305 similarly to the communication of model accessory 315 and model device 310 described above.

System 300 may include one or modules for performing the exemplary disclosed operations. The one or more modules may include an accessory control module for controlling viewer accessory 308 and model accessory 315. The one or more modules may be stored and operated by any suitable components of system 300 (e.g., including processor components) such as, for example, network 330, user device 305, viewer accessory 308, model device 310, model accessory 315, and/or any other suitable component of system 300. For example, system 300 may include one or more modules having computer-executable code stored in non-volatile memory. System 300 may also include one or more storages (e.g., buffer storages) that may include components similar to the exemplary disclosed computing device and network components described below regarding FIGS. 14 and 15. For example, the exemplary disclosed buffer storage may include components similar to the exemplary storage medium and RAM described below regarding FIG. 14. The exemplary disclosed buffer storage may be implemented in software and/or a fixed memory location in hardware of system 300. The exemplary disclosed buffer storage (e.g., a data buffer) may store data temporarily during an operation of system 300.

Figure 3:
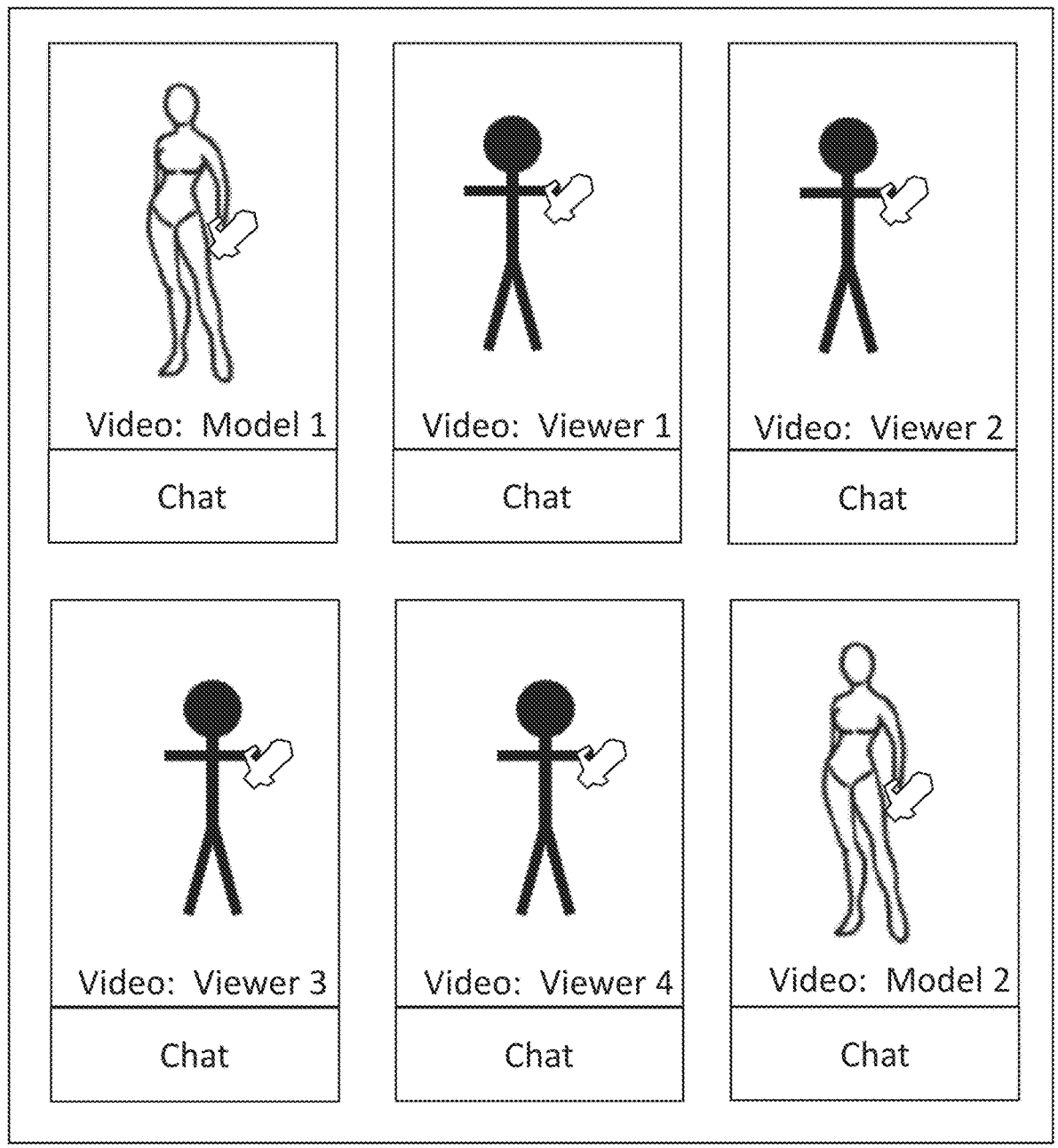
FIG. 3 is a schematic illustration of an exemplary system of the present invention.

The one or more exemplary disclosed modules may also provide a chat room interface via user device 305 and model device 310 for use by each user 320 and model 325. For example, video display of model 325, one or more users 320, and/or and a chat or messaging app (e.g., any suitable chat communication or messaging app such as, for example, text, voice, and/or video chat boxes) may be displayed to each user 320 via user device 305 and to each model 325 via model device 310. One or more users 320 and one or more models 325 may thereby view and chat (e.g., text, voice, and/or video chat) with each other via the one or more exemplary disclosed modules via respective user devices 305 and model devices 310. Each user 320 may thereby view, interact with, and/or chat (e.g., text, voice, and/or video chat) with one or more models 325 and/or other users 320. Also, each model 325 may thereby view, interact with, and/or chat with one or users 320 and/or other models 325. For example, multiple text, voice, and/or video chat boxes including a plurality of users 320 (e.g., viewers each having one or more viewer accessories 308) and/or a plurality of models 325 (e.g., each having one or more model accessories 315) may be displayed to each user 320 and each model 325 via respective user devices 305 and model devices 310. Users 320 and models 325 may thereby view and interact with other users 320 and models 325 that may each have one or more respective accessories (e.g., respective viewer accessories 308 and model accessories 315). FIG. 3 schematically illustrates an exemplary embodiment of the exemplary disclosed chat room that may be displayed to user 320 via user device 305 or to model 325 via model device 310.

Returning to FIG. 1, system 300 may include an imaging device (e.g., a streamer imaging device) such as one or more imaging devices 335. Imaging device 335 may be any suitable imaging device such as a camera. For example, imaging device 335 may be any suitable video camera such as a digital video camera, a webcam, and/or any other suitable camera for recording visual data (e.g., recording a video and/or taking pictures). Imaging device 335 may be for example a three-dimensional video sensor or camera. One or more imaging devices 335 may include a plurality of cameras (e.g., a set of cameras) or a single camera configured to collect three-dimensional image data. In at least some exemplary embodiments, imaging device 335 may be a stereoscopic camera and/or any other suitable device for stereo photography, stereo videography, and/or stereoscopic vision. Imaging device 335 may be substantially entirely integrated into user device 305 and/or model device 310 or may be a stand-alone device. In at least some exemplary embodiments, imaging device 335 may be a smartphone or tablet camera (e.g., that may be integrated into user device 305 and/or model device 310). Imaging device 335 may include a self-developed camera base (e.g., chassis), an integrated camera, and/or any desired third-party camera components. Imaging device 335 and/or the exemplary disclosed modules may operate using any suitable software interface that may be utilized via the exemplary disclosed user devices (e.g., user device 305 and/or model device 310). An operation of imaging device 335 may be controlled by system 300 as described for example below. Imaging device 335 may perform some or substantially all image recognition processing for example as described below (e.g., as described below regarding FIGS. 4-6).

In at least some exemplary embodiments, imaging device 335 may be a streamer camera that may be controlled directly or indirectly by one or more viewer devices (e.g., user device 305) for example via a control panel or any other suitable direct camera control instructions (e.g., from the viewer device). System 300 may control imaging device 335 based on an amount of a user tip (e.g., provided by user 320 via user device 305) for example including converting different amounts of viewer tips into different camera control instructions. Imaging device 335 may be configured to obtain broadcast content of a streamer such as model 325, including for example 2D content, VR content, and/or 4D panoramic content. The exemplary disclosed modules may include a control module that may be associated with imaging device 335, which may be built-in or peripheral to any suitable disclosed components of system 300 (e.g., user device 305) and may communicate with imaging device 335 via any suitable technique such as the exemplary disclosed techniques (e.g., short-range such as WiFi or Bluetooth and/or long range such as internet or 4G/5G). For example, communication may be from a viewer's device (e.g., user device 305 such as a smartphone) to a streamer's device (e.g., model device 310) to a streamer's camera (e.g., imaging device 335 or model device 310), or from a viewer's device (e.g., user device 305 such as a PC) to a streamer's camera (e.g., imaging device 335 or model device 310). In at least some exemplary embodiments, imaging device 335 may have functions including camera rotation, camera displacement (e.g., omnidirectional), camera switch (e.g., switching from camera A to camera B, and/or switch between on/off), panoramic angle adjustment, camera positioning and/or tracking, camera zooming (e.g., including cropping and/or scaling), camera parameters setting (e.g., focus point, exposure, and/or resolution), and/or image identifying and/or processing.

Imaging device 335 may include one or more actuators 335a that may adjust a position of imaging device 335 based on an operation of system 300. Actuators 335a may be for example one or more external actuators disposed at an exterior of imaging device 335 and/or one or more integrated actuators that are completely or partially integrated into imaging device 335 (e.g., disposed and/or integrated within an interior of imaging device 335). In at least some exemplary embodiments, actuator 335a may be internally integrated into imaging device 335 and may turn optical components and/or move lenses of imaging device 335 within a housing of imaging device 335 to zoom in and out at different features or points within a variable field of view of imaging device 335 (e.g., zoom in and out on points or features of the exemplary disclosed user or model and/or accessories such as adult toys). Actuator 335a may also be one or more external and/or internally-integrated mechanical actuators configured to mechanically turn imaging device 335 and move lenses of imaging device 335 to focus in and out at desired objects (e.g., points and/or features of the exemplary disclosed user or model and/or accessories such as adult toys). For example actuator 335a may be a mechanical actuator that is electrically powered, battery-powered, and/or powered via any other suitable power source. Actuator 335a may also be for example a hydraulic actuator, pneumatic actuator, magnetic actuator, and/or any other suitable actuator configured to turn and focus imaging device 335 (e.g., based on a size of imaging device 335).

Figure 4:
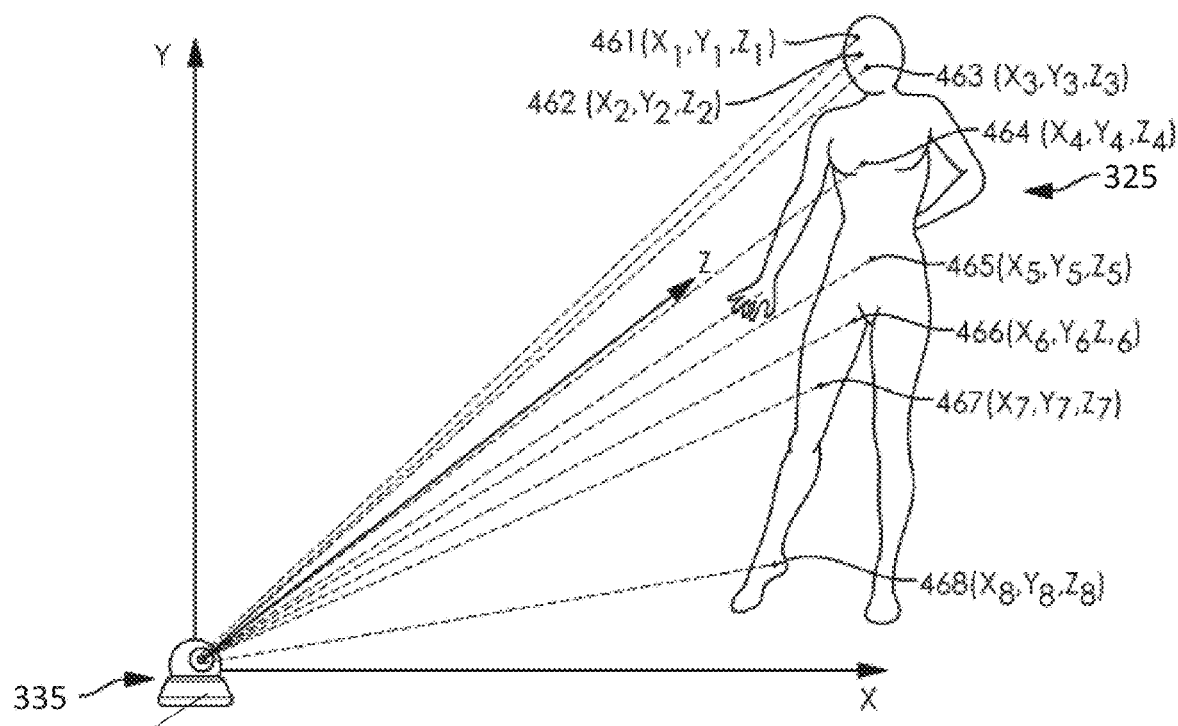
FIG. 4 is a schematic illustration of an exemplary system of the present invention.

For example as illustrated in FIG. 4, model 325 may use model device 310 to control imaging device 335 to define any desired features such as body portions of model 325. For example, FIG. 4 illustrates a plurality of points 461, 462, 463, 464, 465, 466, 467, and 468. For example, model 325 may be positioned within a field of view of imaging device 335 while defining features (e.g., points 461, 462, 463, 464, 465, 466, 467, and 468). Model 325 may utilize model device 310 to define the exemplary features. For example, model device 310 may display a real time video image of model 325 on a display, and may receive input (e.g., via tapping on a touchscreen of model device 310 and/or any other suitable technique for entering input such as keystrokes or pulldowns) to identify desired points (e.g., points 461, 462, 463, 464, 465, 466, 467, and 468) identified by model 325. For example, model 325 may enter the input using real-time video imaging of himself or herself imaged by imaging device 335 and displayed on model device 310, or by using a picture taken by imaging device 335 and displayed on model device 310. The defined features (e.g., identified points such as points 461, 462, 463, 464, 465, 466, 467, and 468) may be predetermined features that may be utilized by system 300 as described for example herein. The identified points (e.g., points 461, 462, 463, 464, 465, 466, 467, and 468) identified on the image data provided by imaging device 335 may be transferred via model device 310 other exemplary disclosed components for use by system 300 as described for example herein. For example, system 300 may store the predetermined features for use during the exemplary disclosed processes. For example, points 461, 462, 463, 464, 465, 466, 467, and 468 may represent recognized images of body portions (e.g., image-recognized body portions) of model 325. During an operation of system 300 as described for example below, coordinates for points 461, 462, 463, 464, 465, 466, 467, and 468 may be determined.

Model 325 may assign any desired information or data to each predetermined feature (e.g., to points 461, 462, 463, 464, 465, 466, 467, and 468). For example, model 325 may input any desired information (e.g., based on input prompts provided by an interface of model device 310) to system 300 via model device 310. For example, model 325 may provide information describing a predetermined feature (e.g., a body portion associated with a point such as points 461, 462, 463, 464, 465, 466, 467, and 468) such as a viewing price or cost or viewing duration. For example, model 325 may set a cost or price to be paid by a user (e.g., user 320) for viewing each predetermined feature and/or a time period during which the user may watch the exemplary image data. In at least some exemplary embodiments, the user may pay a "tip" via system 300 that may be a monetary tip (e.g., currency, cryptocurrency, a prepaid credit, and/or any other suitable item of value) corresponding to the cost or price set by model 325. Model 325 may thereby determine the price to be paid by users to view predetermined features (e.g., points 461, 462, 463, 464, 465, 466, 467, and 468) that may be body portions of model 325.

Figure 5:
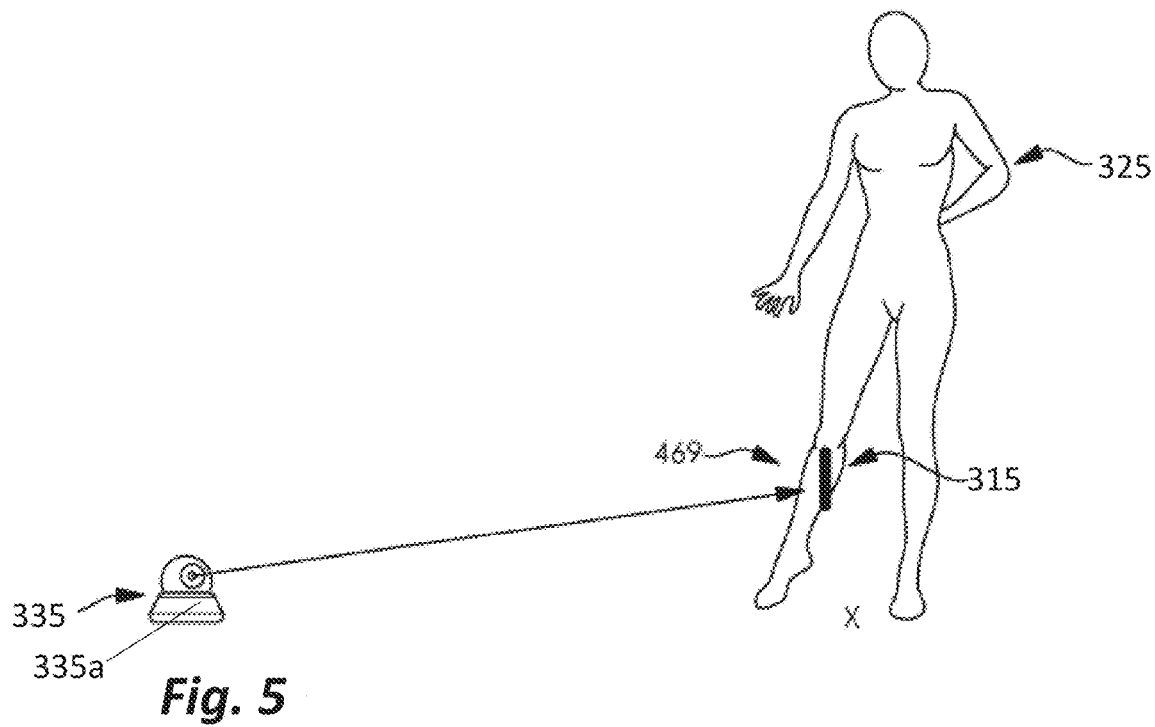
FIG. 5 is a schematic illustration of an exemplary system of the present invention.

Model 335 may define model accessory 315 as illustrated for example in FIG. 5 similar to as described above regarding the exemplary predetermined features (e.g., points 461, 462, 463, 464, 465, 466, 467, and 468). For example, model accessory 315 itself may be recognized as a predetermined feature similar to image recognition of the exemplary predetermined features (e.g., points 461, 462, 463, 464, 465, 466, 467, and 468) described above. Also, model 325 may define features of model accessory 315 corresponding to locations on model 325 on which or against which model accessory 315 may be placed. For example, model 325 may provide data or input to system 300 corresponding to any desired position of model accessory 315 on model 325. For example, system 300 may recognize as predetermined features a location of model accessory 315 on or against certain locations of model 325. The predetermined locations may correspond to model accessory 315 being placed on or against any predetermined feature (e.g., points 461, 462, 463, 464, 465, 466, 467, and 468) and/or any other desired location on or near model 325. Similar to as described above regarding the exemplary predetermined features (e.g., points 461, 462, 463, 464, 465, 466, 467, and 468), model 325 may provide a cost or price to be paid by a user (e.g., user 320) to view model accessory 315 being placed on or against a predetermined feature (e.g., on a predetermined location of model 325 as described above). FIG. 5 illustrates an exemplary predetermined feature (e.g., point 469) associated with a placement of model accessory 315.

System 300 may store images associated with any of the above-described exemplary predetermined features, such as pictures or videos. For example, low-resolution "thumbnail" images or videos as well as high-resolution images or videos may be stored based on the above-described exemplary feature definition and image recognition processes.

System 300 may determine spatial coordinates (e.g., three-dimensional coordinates) of one or more predetermined features. In at least some exemplary embodiments, the exemplary disclosed module may include a location arithmetic module that may calculate three-dimensional coordinate data (e.g., a coordinate x,y,z as defined by a cartesian coordinate system utilizing three axes). As illustrated for example in FIG. 4 showing model 325 (e.g., or in FIG. 5 for model accessory 315), the exemplary disclosed modules may utilize any suitable technique for determining coordinate data based on image data and image recognition data provided by imaging device 335. For example, the exemplary disclosed module may determine three-dimensional vector data to determine a straight-line distance and direction between a predetermined origin (e.g., a center of imaging device 335 that may be defined as coordinate 0,0,0 or any other desired point) and one or more points or features of the image data provided and processed by imaging device 335 and/or any other desired components of system 300. For example, the exemplary disclosed module may arithmetically determine three-dimensional coordinates of points or features of the image data provided and/or processed by imaging device 335 and/or and other suitable devices or components of system 300. For example, for points 461, 462, 463, 464, 465, 466, 467, and 468, the exemplary disclosed module may use image and image recognition data provided by imaging device 335 to determine respective coordinate data x1,y1,z1 for point 461, x2,y2,z2 for point 462, x3,y3,z3 for point 463, x4,y4,z4 for point 464, x5,y5,z5 for point 465, x6,y6,z6 for point 466, x7,y7,z7 for point 467, and/or x8,y8,z8 for point 468 (and/or any other desired points or portions corresponding to a desired feature of model 325, model accessory 315, or other object imaged by imaging device 335). For example based on image and image recognition data provided by imaging device 335 and/or the exemplary disclosed modules, system 300 may determine three-dimensional coordinates based on estimating distance based on: an image size of model 325 (e.g., thereby calculating distance from imaging device 335), stereoscopic or other three-dimensional image data provided directly from imaging data of imaging device 335, predetermined criteria (e.g., a certain distance between imaging device 335 and model 325 being assumed based on operating instructions of system 300, for example indicating that model 325 is to be positioned a certain distance from imaging device 335), input provided by model 325 (e.g., model 325 may input a distance between imaging device 335 and model 325 during operation), and/or based any other suitable technique.

The exemplary disclosed modules may thereby provide three-dimensional coordinate data to system 300 for predetermined features identified above (e.g., points 461, 462, 463, 464, 465, 466, 467, and 468). The exemplary disclosed modules may provide three-dimensional coordinate data in real-time or near real-time. The exemplary disclosed modules may update three-dimensional coordinate data at any desired time interval such as, for example, a few times or many times (e.g., 10 times or more) per second. For example as model 325 moves while being imaged by imaging device 335, the exemplary disclosed modules may operate to use image and image recognition data provided by imaging device 335 and the exemplary disclosed modules to continuously update three-dimensional coordinate data of the exemplary features identified above (e.g., points 461, 462, 463, 464, 465, 466, 467, and 468). The exemplary disclosed modules may thereby provide up-to-date, continuously updated three-dimensional coordinate data of the exemplary features (e.g., portions of model 325 as described for example above) to system 300, thereby providing updated location data of model 325, model accessory 315, and any other desired objects or points in real-time or near-real-time. Some or all location data may be stored so that constantly updated location data may be provided to system 300 corresponding to, for example, running video footage or still pictures of the imaging data that was taken of model 325, model accessory 315, and/or any other desired object or target imaged by imaging device 335.

Figure 6:
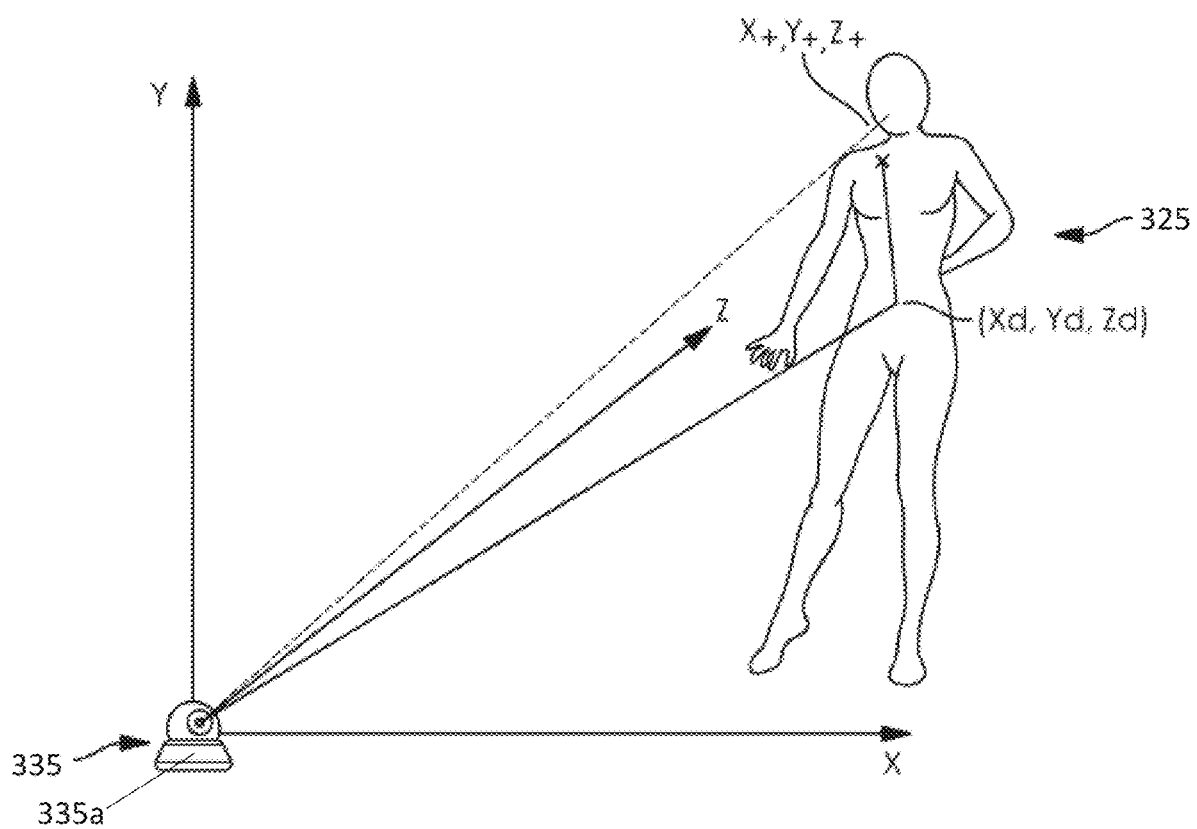
FIG. 6 is a schematic illustration of an exemplary system of the present invention.

System 300 may move imaging device 335 based on the three-dimensional coordinate values determined for example as described above. System 300 may control actuators 335a to turn and/or zoom imaging device 335 to point at and/or zoom in at the feature (e.g., point 461 or any other desired feature) based on the retrieved three-dimensional coordinate. For example, the exemplary disclosed modules may determine a vector pointing from imaging device 335 to the retrieved three-dimensional coordinate (e.g., point 461 or any other desired feature). For example, the exemplary disclosed modules may arithmetically construct a vector that describes a direction of viewing from an origin coordinate of imaging device 335 (e.g., or any other desired point) and the retrieved three-dimensional coordinate. For example as illustrated in FIG. 6, the exemplary disclosed modules may arithmetically calculate an adjustment route of imaging device 335 from its default or current orientation and position to an orientation and position pointing at the identified feature associated with the retrieved three-dimensional coordinate (e.g., point 461). For example as illustrated in FIG. 6, (Xd, Yd, Zd) may be a default setting coordinate (e.g., how imaging device 335 may be positioned by default). (Xt, Yt, Zt) may be the retrieved three-dimensional coordinate associated with the desired exemplary feature (e.g., as requested by user 320 by providing feature input or "tip action"). The exemplary disclosed modules may control imaging device 335 (e.g., via controlling an operation of actuators 335a) to rotate and move one or more lens (e.g., zoom in) at (Xt, Yt, Zt) and maintain this position for a desired time (e.g., any desired time such as 10 seconds or any other duration as described herein). Imaging device 335 may record images in a second mode with an image resolution that may be higher than when imaging device is operating in a first mode (e.g., based on predetermined operation, user input, an amount of tips, and/or any other suitable criteria).

In at least some exemplary embodiments, the exemplary disclosed system, apparatus, and method may include an accessory (e.g., viewer accessory 308 or model accessory 315) such as, for example an adult toy (e.g., a sex toy). The exemplary disclosed system, apparatus, and method may include one or more models (e.g., model 325 such as a streamer) that may be imaged by an imaging device (e.g., imaging device 335 and/or model device 310 including for example a camera) and viewed by a viewer (e.g., user 320). The exemplary disclosed imaging device may be remotely controlled for example by a viewer of a broadcast streamed by a model. For example, an imaging device (e.g., imaging device 335 such as a smart camera) disposed with a model (e.g., in a broadcast room of model 325 such as a streamer's broadcast room) may be remotely controlled by one or more users (e.g., user 320 such as a viewer) via a tipping operation and/or any other suitable input operations, which may increase interaction (e.g., provide a relatively higher and more immersive interaction) between one or more models 325 (e.g., streamers) and one or more users 320 (e.g., viewers). The exemplary disclosed imaging device may also include 4-dimensional (e.g., 4D) streaming and/or virtual reality streaming for example as described herein. The exemplary disclosed imaging device may further include a sex machine (e.g., a robot or robotic arm) for example as described herein.

In at least some exemplary embodiments, the exemplary disclosed system, apparatus, and method may include transferring data (e.g., image and audio data) via streaming, live broadcast, and/or any other suitable data transfer in real-time or near real-time. The data may be recorded by any suitable device such as imaging device 335, model device 310, and/or user device 305, and transferred for example as illustrated in FIG. 1. For example, model 325 (e.g., or user 320) may be imaged by the exemplary disclosed imaging device or user device (imaging device 335, model device 310, and/or user device 305) for example as illustrated in FIGS. 4-6, including for example imaging of the exemplary disclosed accessory (e.g., model accessory 315 or viewer accessory 308). Users of system 300 (e.g., one or more models 325 and/or one or more users 320) may communicate via a chat room for example as illustrated in FIG. 3. A user (e.g., model 325 such as a streamer) located remotely from another user (e.g., user 320 such as a viewer) may stream or broadcast data to the other user via system 300 in real-time or near real-time. For example, one or more models 325 may stream or broadcast (e.g., live-stream or live-broadcast) data (e.g., image, video, and/or audio data) to one or more users 320. A user (e.g., user 320 such as a viewer) located remotely from another user (e.g., model 325 such as a streamer) may remotely control an imaging device (e.g., imaging device 335, user device 305, and/or model device 310) and/or an accessory (e.g., model accessory 315 and/or viewer accessory 308) of another user (e.g., model 325 such as a streamer). For example, a viewer such as user 320 may remotely control a camera imaging a model and/or an accessory of the model in real-time or near real-time while viewing the model during streaming or live broadcasting performed by the model such as model 325. Remote control may be based on tipping by one or more users (e.g., users 320 providing a tip such as currency, digital currency, cryptocurrency, and/or any other suitable item of value), predetermined criteria, algorithms, artificial intelligence operations, and/or any other suitable input or criteria during an operation of system 300.

The exemplary disclosed imaging device (e.g., imaging device 335, user device 305, and/or model device 310) may be controlled via any suitable technique providing dynamic camera control in real-time or near real-time. In at least some exemplary embodiments, through input (e.g., viewer input and/or behavior) such as tipping, the exemplary disclosed imaging device imaging a model (e.g., located in the model's live broadcast room) may be remotely controlled (e.g., based on tips provided by one or more viewers) to perform one or more functions (e.g., camera functions) during live broadcast shooting. The exemplary disclosed modules and applications (e.g., installed on the exemplary disclosed devices such as user device 305 and/or model device 310) may utilize any suitable software (e.g., Vibe-Mate APP and Cam Extension).

Figure 7A:
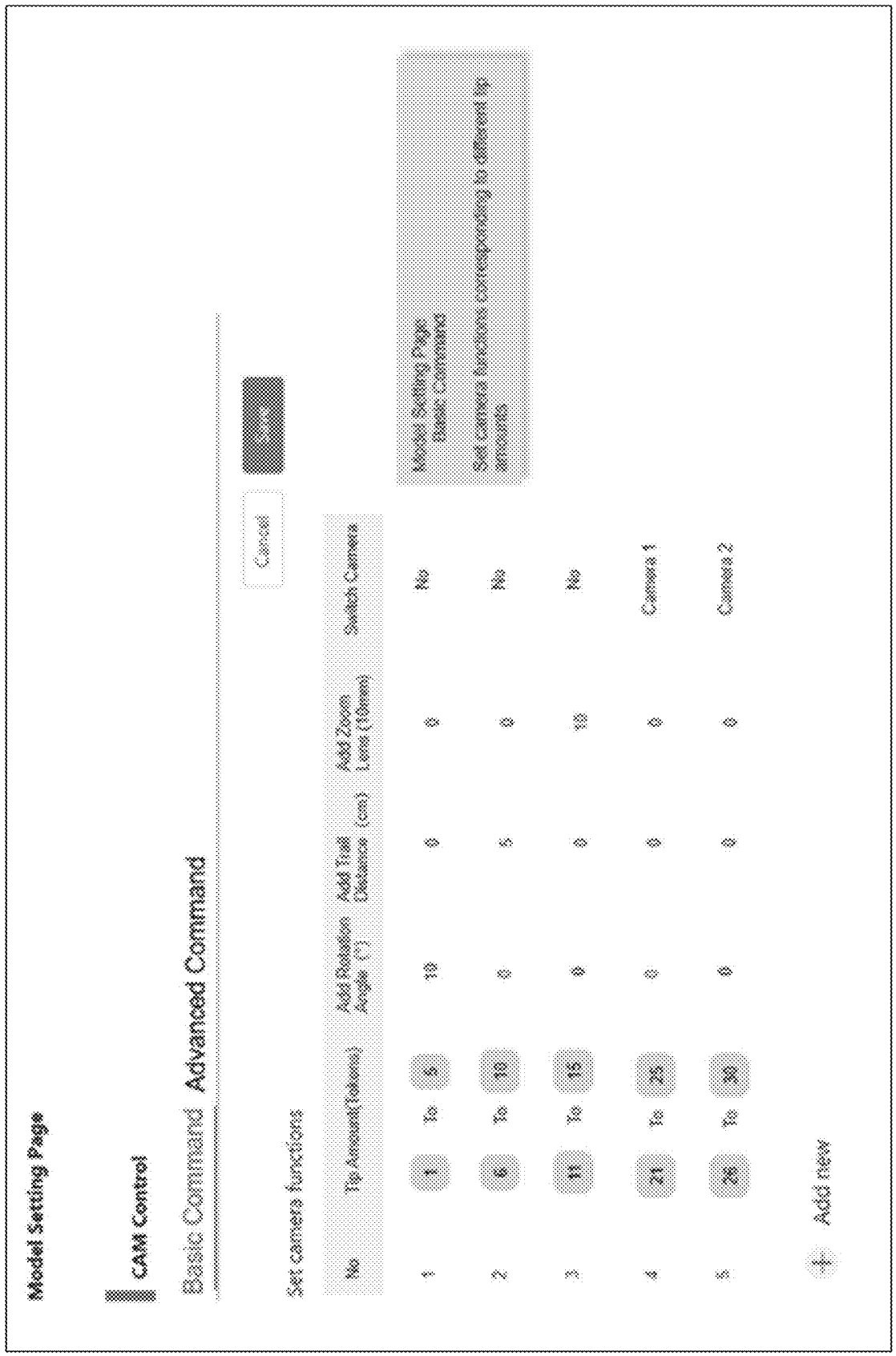
FIG. 7A is a schematic illustration of an exemplary system of the present invention.
Figure 7B:
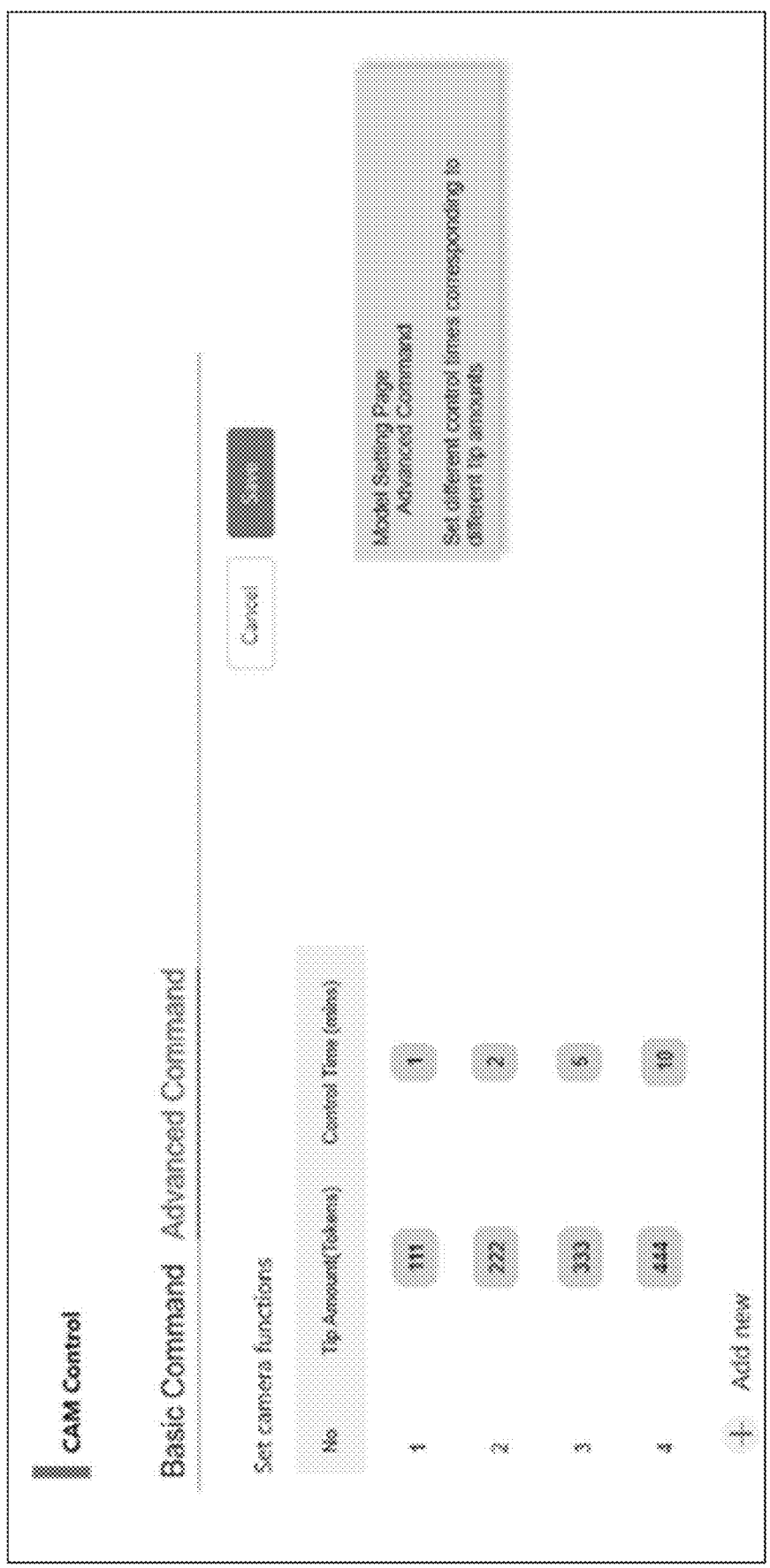
FIG. 7B is a schematic illustration of an exemplary system of the present invention.

FIGS. 7A and 7B illustrate exemplary criteria (e.g., application settings) for controlling the exemplary disclosed imaging device (e.g., imaging device 335, user device 305, and/or model device 310). FIGS. 7A and 7B may illustrate a graphical user interface displayed to a user (e.g., user 320 or model 325) via an exemplary disclosed user device (e.g., user device 305 and/or model device 310). For example, remote control may be based on different ranges of tip amounts. As illustrated in FIGS. 7A and 7B, a rotation angle may be increased or decreased, a trail distance may be increased or decreased, a zoom lens may be increased or decreased, a camera may be switched (e.g., a display may be switched between cameras), a control time of a camera may be increased or decreased, and/or any other suitable control parameter may be controlled based on an amount of tips provided by a user (e.g., user 320). Accordingly, a user may have increased control over the exemplary disclosed imaging device based on an amount of tips provided. For example, a user (e.g., user 320) may be able to swivel, focus, and/or move the exemplary disclosed imaging device imaging a model (e.g., model 325) by a greater amount and/or for a greater period of time in real-time or near real-time (e.g., during live streaming or broadcast).

Figure 8A:
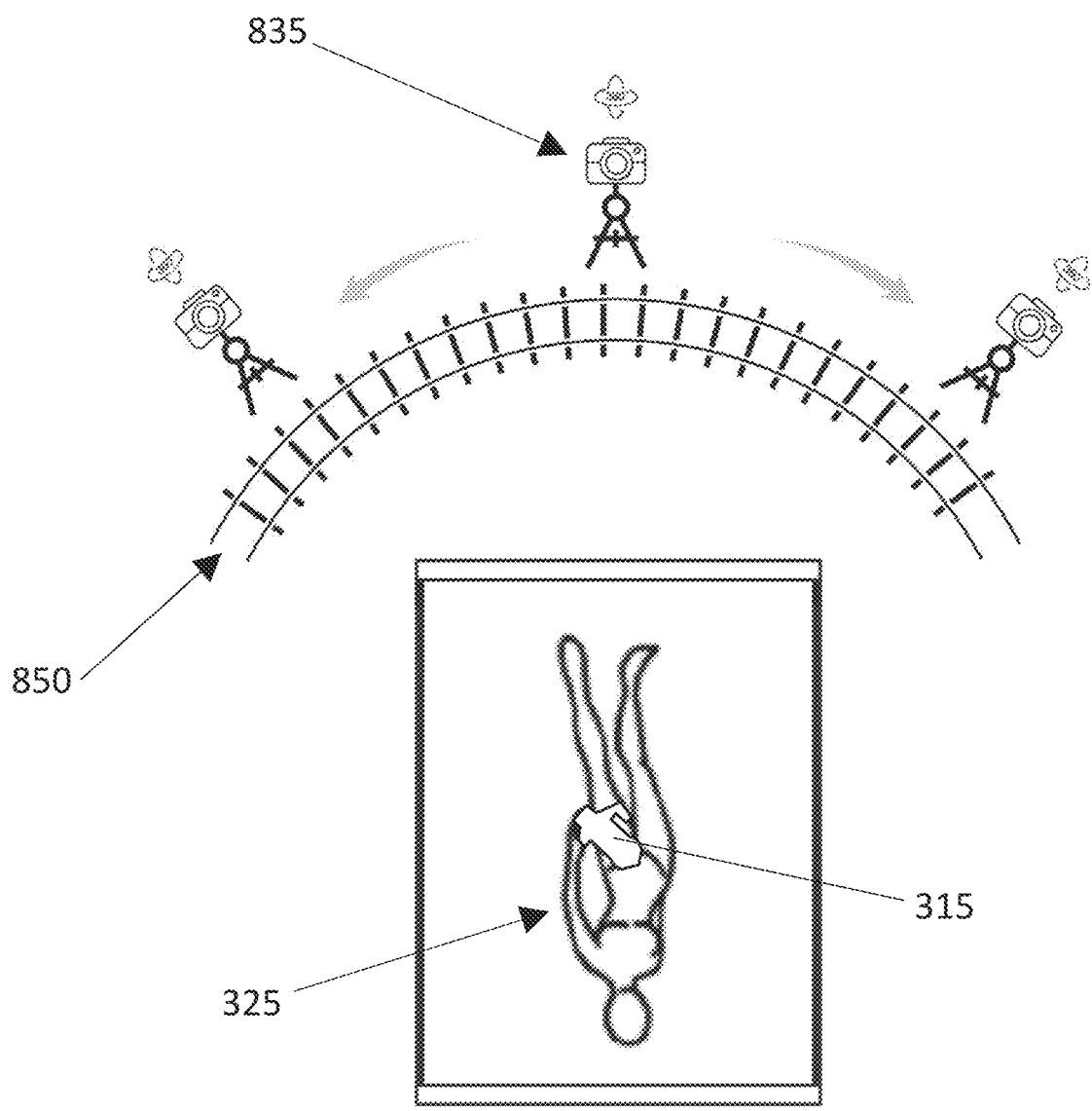
FIG. 8A is a schematic illustration of an exemplary system of the present invention.
Figure 8B:
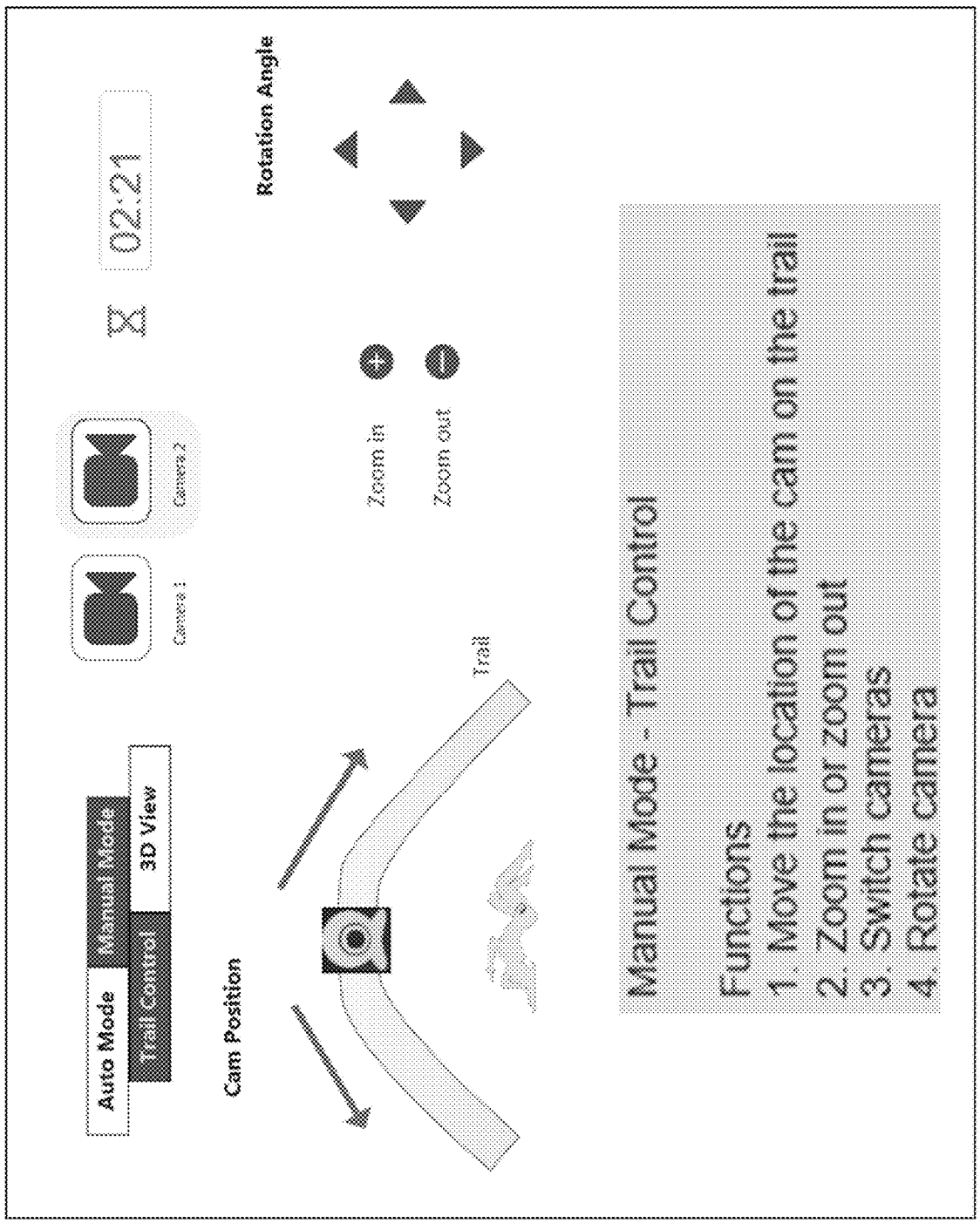
FIG. 8B is a schematic illustration of an exemplary system of the present invention.

FIGS. 8A and 8B illustrate an exemplary embodiment of system 300. As illustrated in FIG. 8A, an imaging device 835 may be generally similar to imaging device 335. Imaging device 835 may be located with model 325 (e.g., or user 320) and may record and transfer data (e.g., image, video, audio, thermal, and/or any other desired data) associated with model 325 and/or model accessory 315. For example, imaging device 835 may be located in a streaming or broadcast location or room of model 325 (e.g., or user 320). Imaging device 835 may be controlled (e.g., remotely controlled) by model 325 (e.g., and/or user 320) for example as described above. For example, imaging device 835 may be controlled based on tips provided by a viewer (e.g., user 320) who may view (e.g., view a live data stream or a live broadcast) of a model (e.g., model 325) in real-time or near real-time. A viewer (e.g., user 320) may view model 325 via a display of user device 305. User 320 may remotely control imaging device 835 imaging model 325 in real-time or near real-time for example as described herein. User 320 may remotely control imaging device 835 via a graphical user interface (e.g., as illustrated in FIG. 8B) displayed via user device 305 and/or any other suitable technique.

Returning to FIG. 8A, imaging device 835 may be movable along a support assembly such as a structural assembly 850. Structural assembly 850 may include a track, support members, and/or any other suitable structural components for guiding a movement of imaging device 835 for example as illustrated in FIG. 8A. Imaging device 835 and/or structural assembly 850 may include any suitable motor or actuator that may be driven by any suitable power system (e.g., electrical, hydraulic, pneumatic, magnetic, and/or any other suitable power system) for moving imaging device 835 along structural assembly 850. For example, imaging device 835 may include wheels and/or any other suitable structural components that may be operably connected with structural assembly 850 to move imaging device 835 along structural assembly 850 (e.g., a wheeled assembly movable along a track). User 320 may remotely control imaging device 835 to move, rotate (e.g., swivel), zoom, and/or make any other desired movements relative to structural assembly 850, model 325, and/or model accessory 315 (e.g., that may be supported on furniture such as a chair or bed).

A graphical user interface (e.g., as illustrated in FIG. 8B) and/or a live data stream (e.g., a live stream or broadcast including images, video, and/or audio) of model 325 (e.g., and model accessory 315) may be displayed to user 320 in real-time or near real-time via user device 305. User 320 may remotely control imaging device 835 via the exemplary disclosed user interface (e.g., as illustrated in FIG. 8B). For example as illustrated in the exemplary user interface of FIG. 8B, user 320 may set a mode to auto mode or manual mode, move imaging device 835 along support assembly 850, move (e.g., rotate, elevate, or zoom) imaging device 835, and/or control any other desired movement or action of imaging device 835. Different tipping ranges may correspond to different camera control instructions provided via the exemplary disclosed user interface. For example, 1-10 tip tokens may provide a predetermined rotation angle such as 1 token allowing up to 10 degrees, 2 tokens allowing up to 20 degrees and so on. Varying amounts of tip tokens may similarly allow differing ranges of up and down movement of imaging device 835, left and right movement of imaging device 835, wiggle of imaging device 835, zooming in and out of imaging device 835, switching to different imaging devices 835, sliding imaging device 835 different distances, a pop-up control pane on a viewer side being provided, and/or any other suitable ranges of activity. User 320 (e.g., or model 325) may thereby remotely control imaging device 835 to provide an interactive live stream or broadcast of model 325 (e.g., or user 320).

Figure 9A:
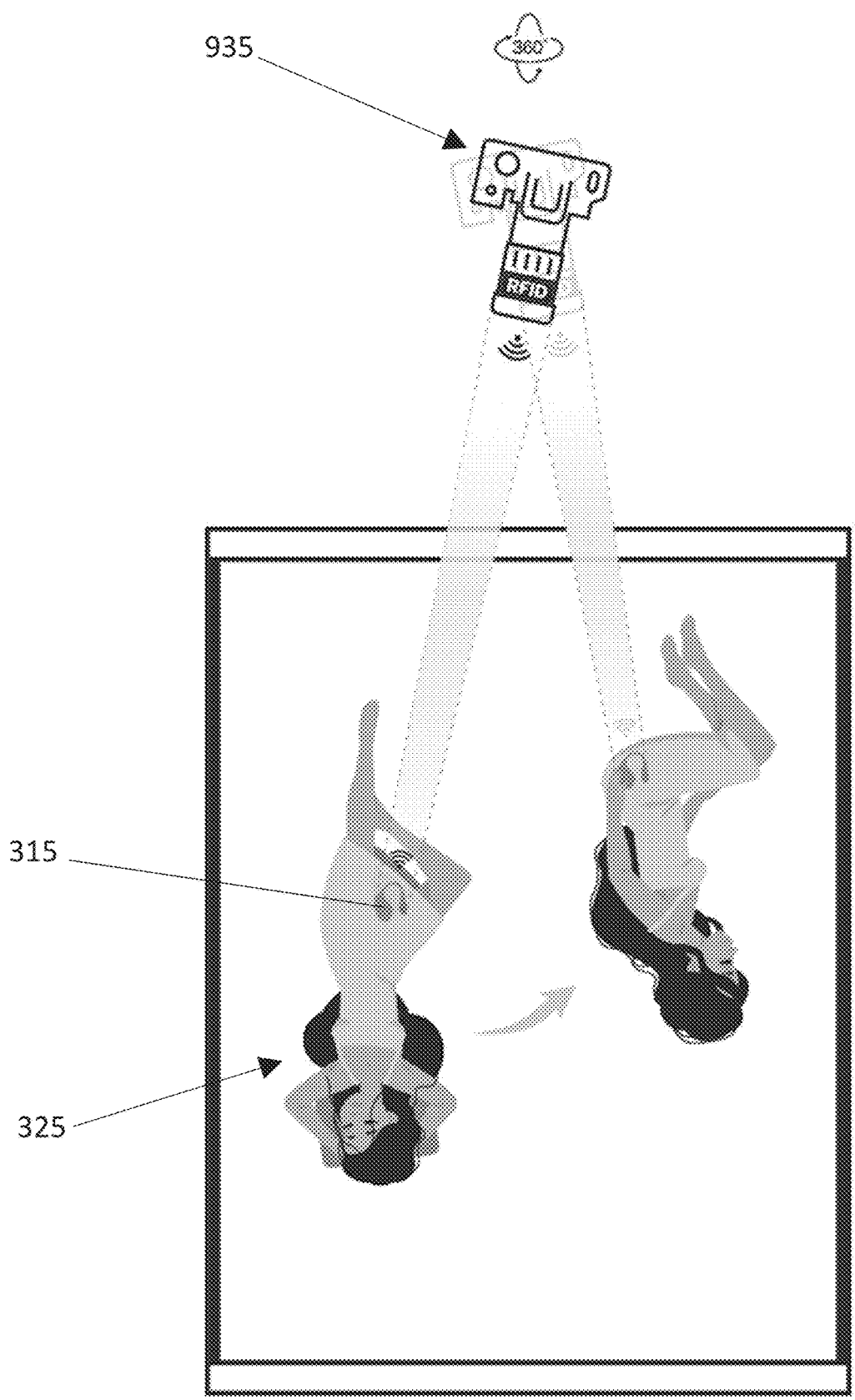
FIG. 9A is a schematic illustration of an exemplary system of the present invention.
Figure 9B:
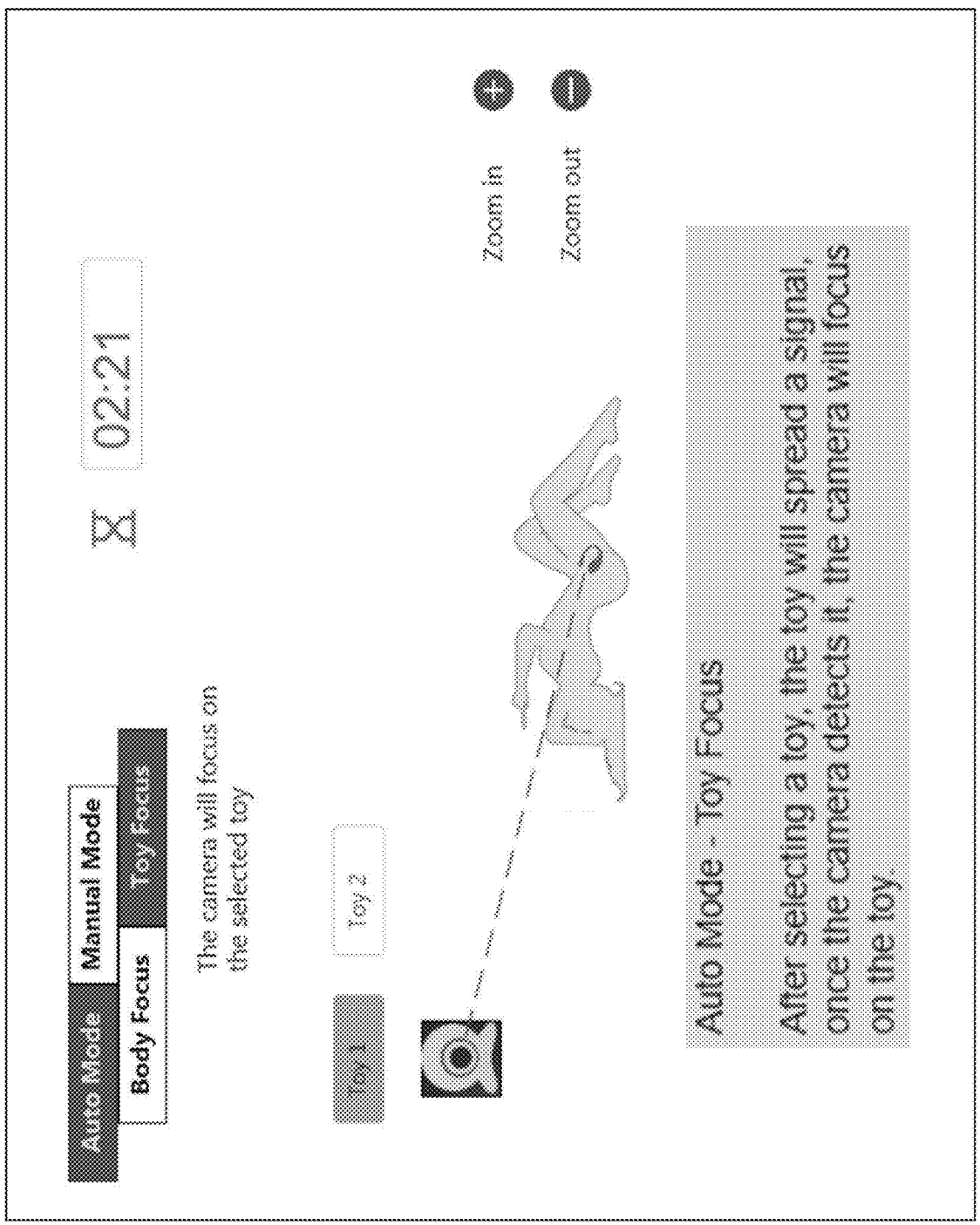
FIG. 9B is a schematic illustration of an exemplary system of the present invention.
Figure 9C:
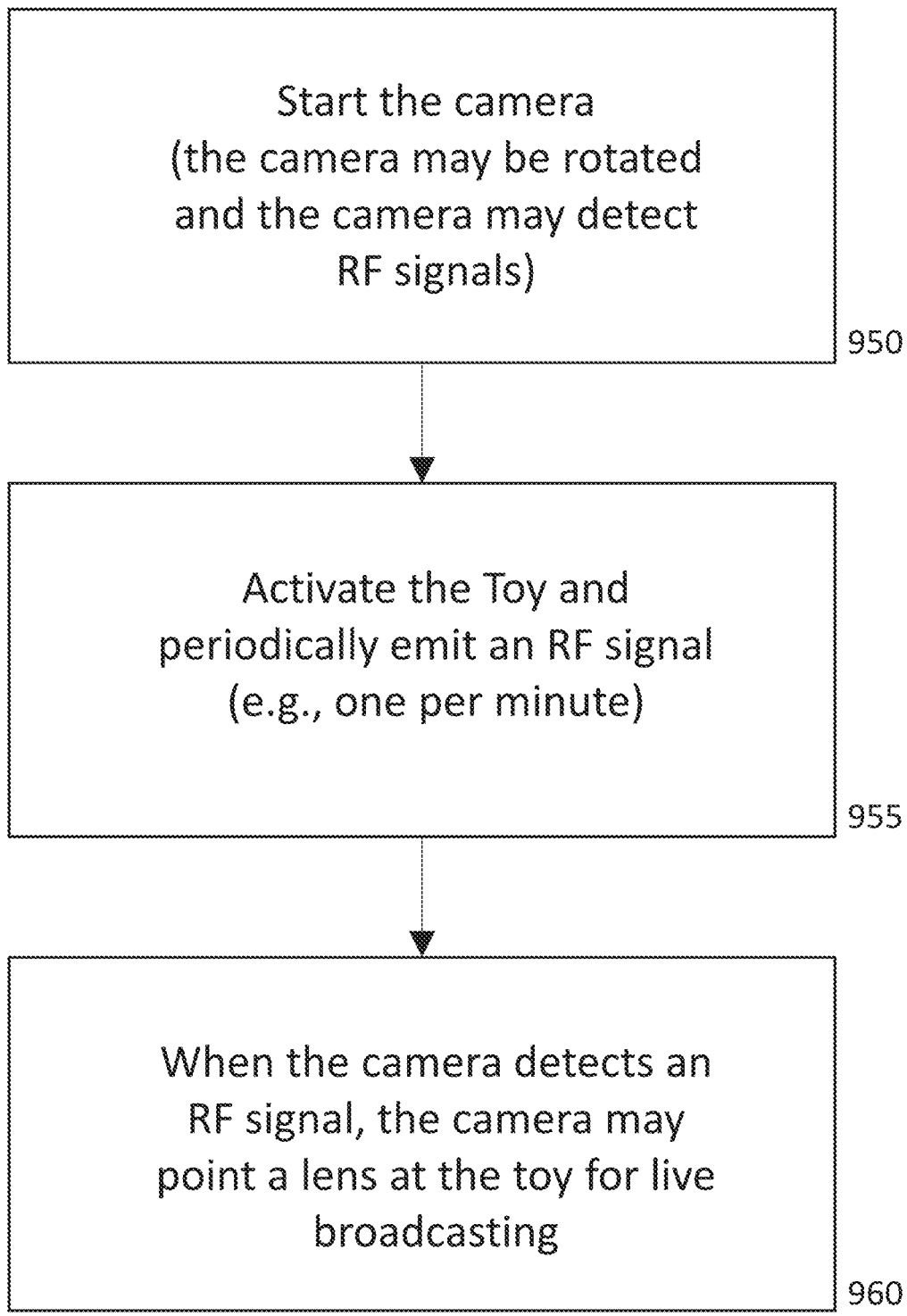
FIG. 9C is a flowchart showing an exemplary process of the present invention.

FIGS. 9A-9C illustrate another exemplary embodiment of system 300. As illustrated in FIG. 9A, an imaging device 935 may be generally similar to imaging device 335. Imaging device 935 may be located with model 325 (e.g., or user 320) and may record and transfer data (e.g., image, video, audio, thermal, and/or any other desired data) associated with model 325 and/or model accessory 315. For example, imaging device 935 may be located in a streaming or broadcast location or room of model 325 (e.g., or user 320). Imaging device 935 may be controlled (e.g., remotely controlled) by model 325 (e.g., and/or user 320) for example as described above. For example, imaging device 935 may be controlled based on tips provided by a viewer (e.g., user 320) who may view (e.g., view a live data stream or a live broadcast) of a model (e.g., model 325) in real-time or near real-time. A viewer (e.g., user 320) may view model 325 via a display of user device 305. User 320 may remotely control imaging device 935 imaging model 325 in real-time or near real-time for example as described herein. User 320 may remotely control imaging device 935 via a graphical user interface (e.g., as illustrated in FIG. 9B) displayed via user device 305 and/or any other suitable technique.

As illustrated in FIG. 9A, model 325 may move (e.g., move around) during a live broadcast, which may make manually adjusting imaging device 935 nuanced. To account for movement of model 325 and/or model accessory 315, imaging device 935 may be automatically moved (e.g., adjusted) by system 300 to a position that may attract an interest of a viewer such as user 320. The automatic movement may be based on user input (e.g., in response to the viewer's selecting operation). The automatic movement may be based on system 300 detecting a signal (e.g., a radio frequency signal or any other suitable type of signal for example as described herein) transmitted from model accessory 315. In at least some exemplary embodiments, interval detection may be used to provide regular or periodic adjustment of imaging device 935 (e.g., to avoid continuous adjustment and jitter for when imaging device 935 may be performing continuous image recognition and tracking for example as described herein).

A graphical user interface (e.g., as illustrated in FIG. 9B) and/or a live data stream (e.g., a live stream or broadcast including images, video, and/or audio) of model 325 (e.g., and model accessory 315) may be displayed to user 320 in real-time or near real-time via user device 305. User 320 may remotely control imaging device 935 via the exemplary disclosed user interface (e.g., as illustrated in FIG. 9B). For example as illustrated in the exemplary user interface of FIG. 9B, user 320 may set a mode to auto mode or manual mode, and/or may set a focus (e.g., image recognition focus) to a body of model 325 or an accessory (e.g., model accessory 315) for automatic tracking. For example when an accessory is selected for tracking, model accessory 315 may provide a signal (e.g., provide a signal at desired time periods and/or spread a signal) that may be detected by imaging device 935 and used for imaging device 935 to focus on model accessory 315. User 320 (e.g., or model 325) may thereby remotely control imaging device 935 to provide an interactive live stream or broadcast of model 325 (e.g., or user 320).

FIG. 9C illustrates an exemplary process of the exemplary embodiment of system 300 illustrated in FIGS. 9A and 9B. At step 950, imaging device 935 may be rotated and may prepare to detect signals (e.g., RF signals) of model accessory 315. At step 955, model accessory 315 may be activated and may periodically emit an RF signal (e.g., one signal per minute or any other desired time interval). At step 960, when imaging device 935 detects an RF signal, imaging device 935 may point to (e.g., point a lens at) model accessory 315 in real-time or near real-time during live stream or broadcasting.

Figure 10A:
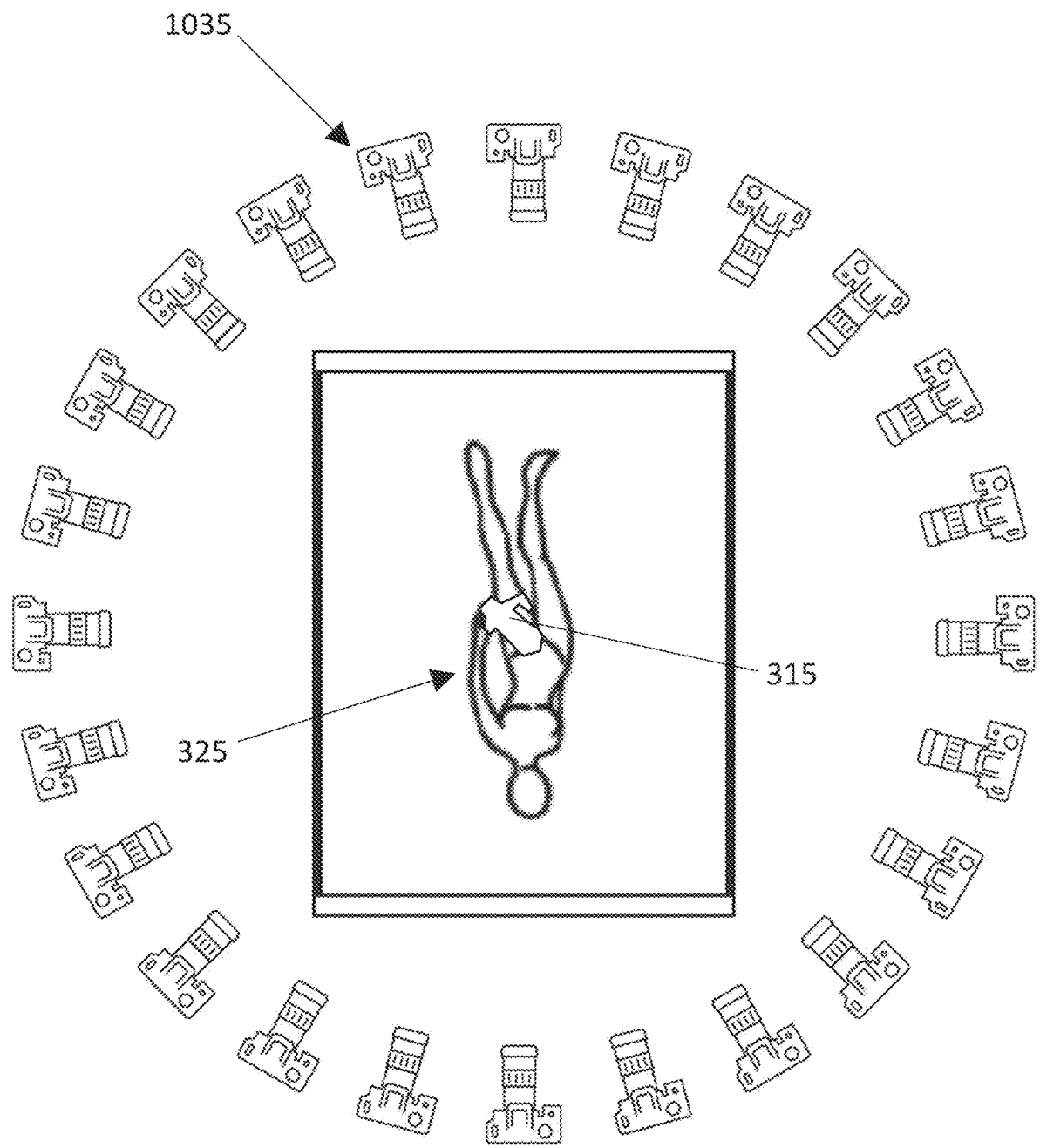
FIG. 10A is a schematic illustration of an exemplary system of the present invention.
Figure 10B:
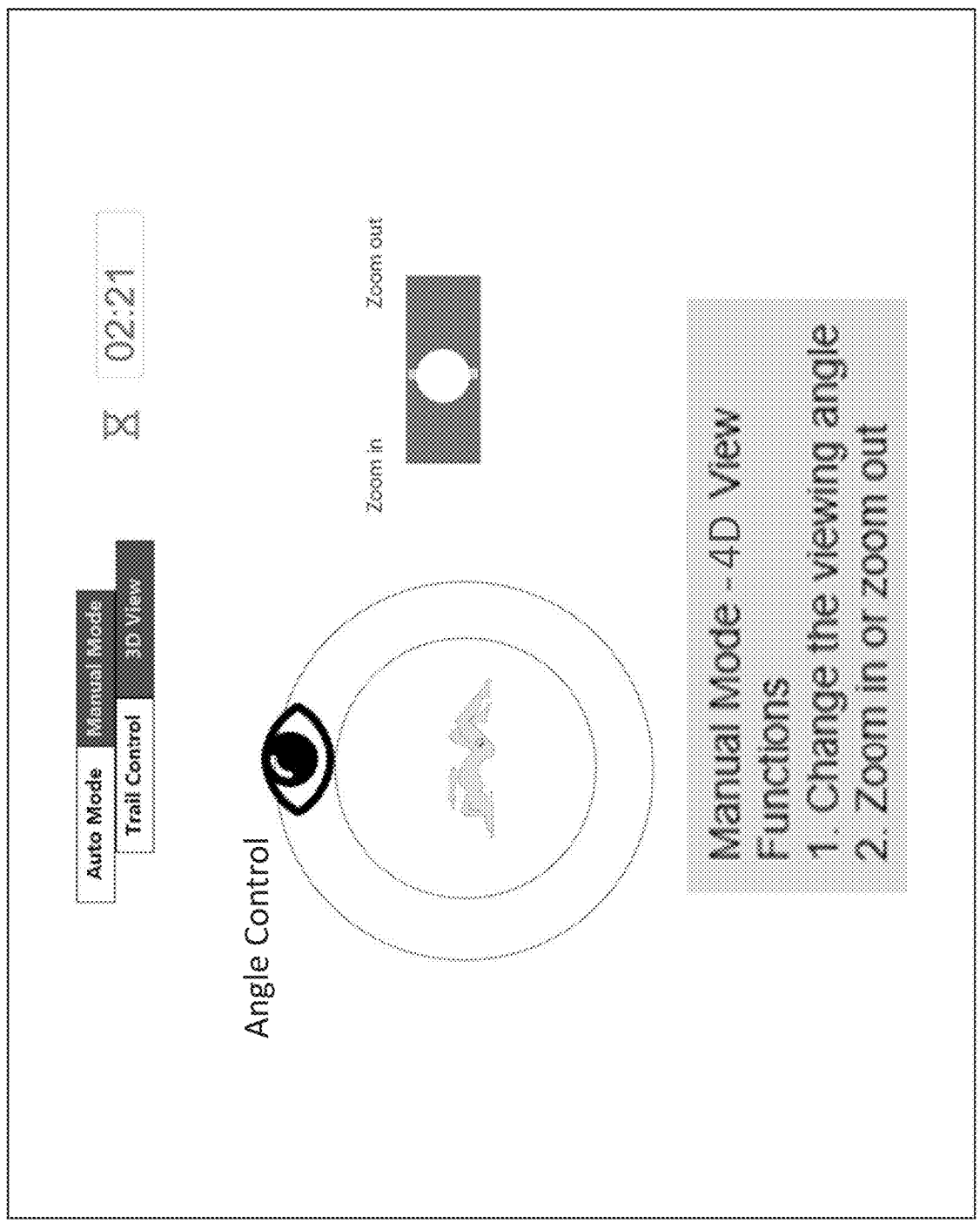
FIG. 10B is a schematic illustration of an exemplary system of the present invention.

FIGS. 10A and 10B illustrate another exemplary embodiment of system 300. As illustrated in FIG. 10A, an imaging device 1035 may be generally similar to imaging device 335. A plurality of imaging devices 1035 may be located with model 325 (e.g., or user 320) and may record and transfer data (e.g., image, video, audio, thermal, and/or any other desired data) associated with model 325 and/or model accessory 315. For example, imaging devices 1035 may be located in a streaming or broadcast location or room of model 325 (e.g., or user 320). Imaging devices 1035 may be controlled (e.g., remotely controlled) by model 325 (e.g., and/or user 320) for example as described above. For example, imaging devices 1035 may be controlled based on tips provided by a viewer (e.g., user 320) who may view (e.g., view a live data stream or a live broadcast) of a model (e.g., model 325) in real-time or near real-time. A viewer (e.g., user 320) may view model 325 via a display of user device 305. User 320 may remotely control imaging devices 1035 imaging model 325 in real-time or near real-time for example as described herein. User 320 may remotely control imaging devices 1035 via a graphical user interface (e.g., as illustrated in FIG. 10B) displayed via user device 305 and/or any other suitable technique. Imaging devices 1035 may be disposed around a position of model 325 for example as illustrated in FIG. 10A.

For example as illustrated in FIG. 10A, imaging devices 1035 may be disposed around model 325 (e.g., or user 320) to provide four-dimensional (4D) imaging of model 325. Multiple imaging devices 1035 (e.g., cameras) together may render imaging (e.g., shooting scenes) into a multi-dimensional live broadcast space in real-time or near real-time. A viewer (e.g., user 320) may adjust the viewing angle in real-time or in near real-time by controlling an imaging device 1035 of the plurality of imaging devices 1035 to provide imaging. The user may thereby control an angle from which a display is provided in real-time or near real-time. Control of imaging devices 1035 may provide a "4D full view" based for example on controlling imaging devices 1035 that may be high-speed cameras (e.g., in a first-line filling area for example as illustrated in FIG. 10A). System 300 may provide 4D broadcast content that may be comprised of video frames, with each video frame being 3D broadcast content captured by one or more of the plurality of imaging devices 1035. Viewers (e.g., users 320) may watch a live broadcast via user device 305 (e.g., via a real-time stitching screen and 5G high-speed transmission). Viewers (e.g., users 320) may control imaging devices 1035 to provide a viewing display that may freely rotate a viewing angle, may zoom in and out to adjust a screen display and/or resolution, and/or make any other desired display changes based on changing the imaging device 1035 providing data for displaying (e.g., on user device 305). Any desired number of viewers (e.g., users 320) may view model 325 (e.g., who may be operating model accessory 315) from any desired imaging device 1035 (e.g., as illustrated in FIG. 10B) to provide a desired (e.g., customized display) without interfering with other users. For example, each of the plurality of imaging devices 1035 may continuously transfer imaging data, with any desired number of viewers may utilizing data transferred from any of the imaging devices 1035 in any desired order or sequence (e.g., different users simultaneously switching between any desired imaging device 1035 in any desired order).

A graphical user interface (e.g., as illustrated in FIG. 10B) and/or a live data stream (e.g., a live stream or broadcast including images, video, and/or audio) of model 325 (e.g., and model accessory 315) may be displayed to user 320 in real-time or near real-time via user device 305. User 320 may remotely control imaging devices 1035 via the exemplary disclosed user interface (e.g., as illustrated in FIG. 10B). For example as illustrated in the exemplary user interface of FIG. 10B, user 320 may set a mode to auto mode or manual mode, and/or control a zoom of one or more imaging devices 1035. Users may also control the angle from which to view model 325 via the exemplary disclosed user interface, thereby controlling which of the plurality of imaging devices 1035 provides display data to the user interface (e.g., controlling from which angle a viewing display is provided). For example as illustrated in FIG. 10B, users may use the exemplary disclosed Angle Control element to control an angle from which model 325 is viewed (e.g., using a manual mode to adjust a 4D view). User 320 (e.g., or model 325) may thereby remotely control imaging devices 1035 and/or data provided by imaging devices 1035 to provide an interactive live stream or broadcast of model 325 (e.g., or user 320). Accordingly, viewers may play as a live-show director to interact (e.g., have immersive interaction) with the streamer.

Figure 11A:
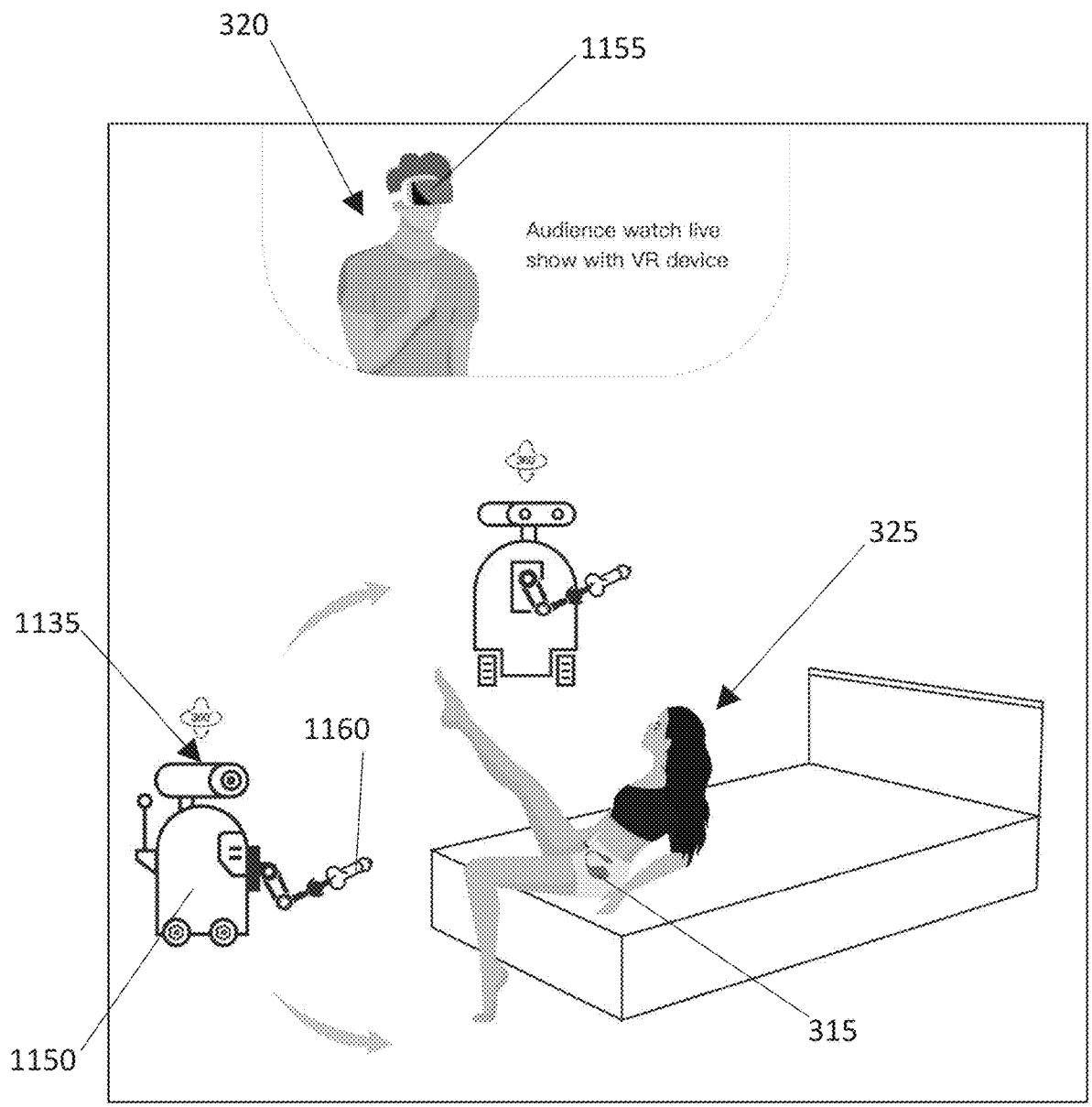
FIG. 11A is a schematic illustration of an exemplary system of the present invention.
Figure 11B:
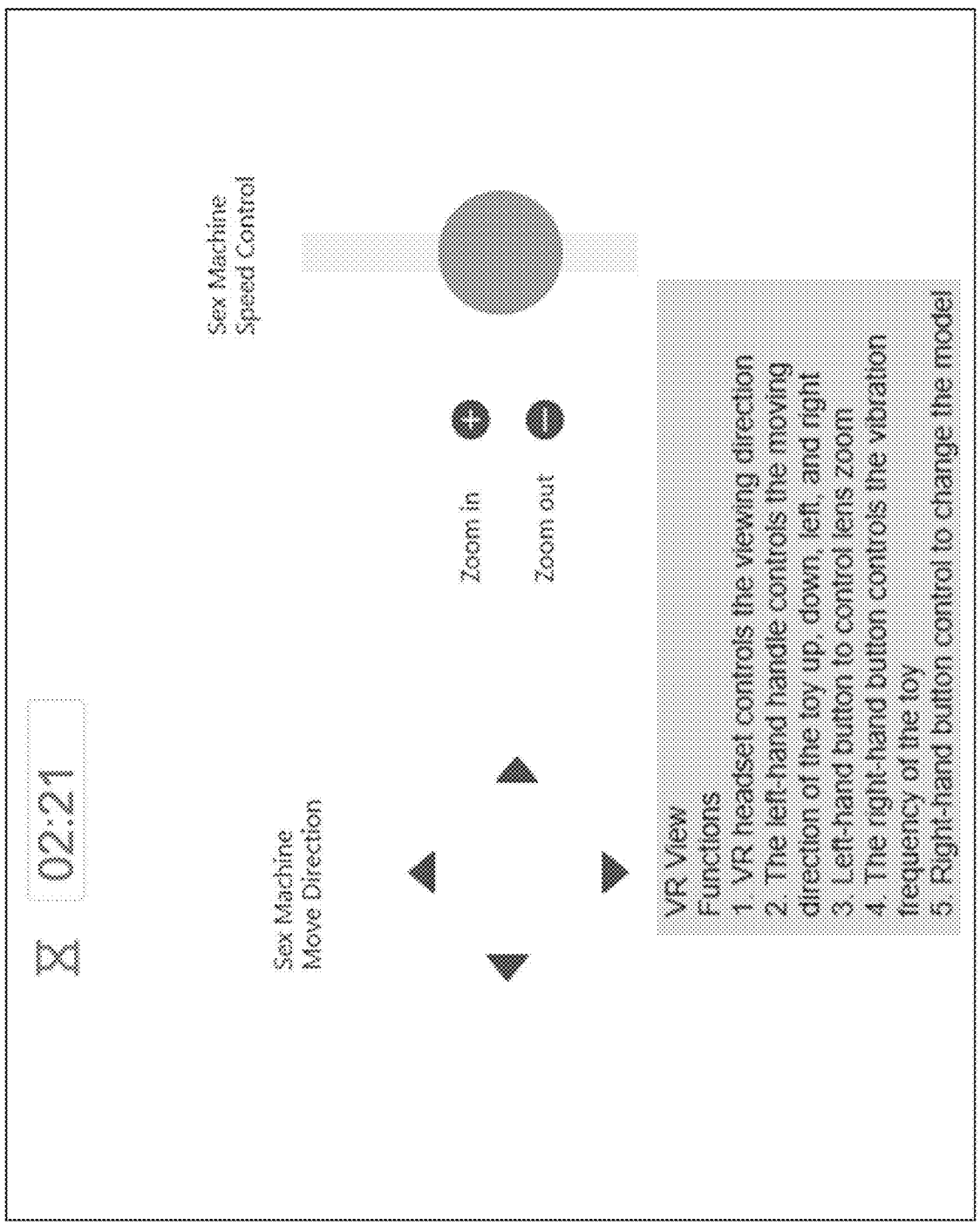
FIG. 11B is a schematic illustration of an exemplary system of the present invention.

FIGS. 11A and 11B illustrate another exemplary embodiment of system 300. As illustrated in FIG. 11A, an imaging device 1135 may be generally similar to imaging device 335. Imaging device 1135 may be operably connected to a robotic assembly 1150. Imaging device 1135 (e.g., and robotic assembly 1150) may be located with model 325 (e.g., or user 320) and may record and transfer data (e.g., image, video, audio, thermal, and/or any other desired data) associated with model 325 and/or model accessory 315. For example, imaging device 1135 (e.g., and robotic assembly 1150) may be located in a streaming or broadcast location or room of model 325 (e.g., or user 320). Imaging device 1135 (e.g., and robotic assembly 1150) may be controlled (e.g., remotely controlled) by model 325 (e.g., and/or user 320) for example as described above. For example, imaging device 1135 (e.g., and robotic assembly 1150) may be controlled based on tips provided by a viewer (e.g., user 320) who may view (e.g., view a live data stream or a live broadcast) of a model (e.g., model 325) in real-time or near real-time. A viewer (e.g., user 320) may view model 325 via a display of user device 305. User 320 may remotely control imaging device 1135 (e.g., and robotic assembly 1150) imaging model 325 in real-time or near real-time for example as described herein. User 320 may remotely control imaging device 1135 (e.g., and robotic assembly 1150) via a graphical user interface (e.g., as illustrated in FIG. 11B) displayed via user device 305 and/or any other suitable technique.

As illustrated in FIG. 11A, imaging device 1135 may be attached (e.g., movably and/or mechanically attached) to robotic assembly 1150. Also for example, imaging device 1135 and robotic assembly 1150 may be integrally formed. User 320 may watch (e.g., remotely watch) a live show using a virtual reality (VR) device via control of imaging device 1135 and robotic assembly 1150. For example, user 320 may control robotic assembly 1150 and imaging device 1135 via VR control, with movements of user 320 controlling movements of robotic assembly 1150 and imaging device 1135. User 320 may utilize a VR device 1155. VR device 1155 may be any suitable type of VR device such as a VR headset that may communicate with imaging device 1135 via components of system 300 for example as described herein. Imaging device 1135 may include a VR camera, a panoramic camera, a binocular camera, and/or any other suitable type of camera. Imaging device 1135 may be attached to and/or integrated with robotic assembly 1150 that may be a movable apparatus (e.g., a walking or rolling apparatus) or any suitable adult entertainment device such as a sex machine or a sex robot. Robotic assembly 1150 may include a rotatory and/or moving chassis configured to attach to imaging device 1135. Robotic assembly 1150 may include a pulley attached on a railway, and/or robotic members (e.g., robotic arm, feet, and/or wheels). Robotic assembly 1150 may be a drone. Based on provided tips and/or any other suitable criteria, a viewer such as user 320 may interact with model 325 (e.g., immersive interaction) based on controlling robotic assembly 1150 and imaging device 1135. For example, user 320 may control robotic assembly 1150 and imaging device 1135 to watch model 325 dancing in front of or around user 320 (e.g., based on moving relative to robotic assembly 1150 and imaging device 1135), move closer to model 325 and/or zoom a view in or out on model 325, control robotic assembly 1150 (e.g., via a robotic arm) to manipulate an accessory 1160 (e.g., an adult toy such as a vibrator, dildo, sex toy, spray gun such as a fluid or water spray gun, and/or other suitable adult toy), and/or any other desired action.

In at least some exemplary embodiments, the exemplary disclosed system, apparatus, and method may include a viewer VR apparatus, a streamer camera, a streamer device such as a VR camera, a control module, and one or more viewer devices that may be configured to stream VR broadcast content obtained by the VR camera, having a position that may be controlled by the one or more viewer devices, to the viewer device configured with the viewer VR apparatus. The viewer VR apparatus (e.g., VR device 1155) may include PC+VR glasses, an integrated VR device, and/or a pair of goggles carrying a cellphone (e.g., user device 305) that displays VR content in a split-screen mode. Viewers (e.g., users 320) may watch a streamer's VR show through their VR headsets, while controlling a position of a VR camera located with the streamer (e.g., model 325). Accordingly, viewers may play as a protagonist in a first person perspective to interact (e.g., have immersive interaction) with the streamer.

In at least some exemplary embodiments and as illustrated in FIG. 11A, system 300 may control imaging device 1135 to locate (e.g., visually locate) portions of model 325 (e.g., genitals or other body parts) for example by image recognition as described herein. Based on the identified locations, robotic assembly 1150 may manipulate accessory 1160 (e.g., lift, lower, tilt, and/or any other desired movement) to move accessory 1160 to a desired position and/or contact model 325. For example, user 320 may control robotic assembly to stimulate (e.g., sexually stimulate) model 325 using accessory 1160. Also for example, accessory 1160 may include a sprayer (e.g., a built-in fluid or water spray gun) that may be filled and replenished by model 325 and controlled (e.g., remotely controlled via VR) by user 320 in real-time or near real-time during a live stream or live broadcast. VR control may include use of a VR broadcast website or chat room (e.g., similar to as illustrated in FIG. 3). In some exemplary embodiments, user 320 may complete a tipping operation via eye outlines and/or iris imaging via VR device 1155 in real-time or near real-time during a live stream or live broadcast.

A graphical user interface (e.g., as illustrated in FIG. 11B) and/or a live data stream (e.g., a live stream or broadcast including images, video, and/or audio) of model 325 (e.g., and model accessory 315) may be displayed to user 320 in real-time or near real-time via user device 305. User 320 may remotely control imaging device 1135 (e.g., and robotic assembly 1150) via the exemplary disclosed user interface (e.g., as illustrated in FIG. 11B). For example as illustrated in the exemplary user interface of FIG. 11B, user 320 may control a movement direction and/or speed of robotic assembly 1150 and/or any other desired operation of robotic assembly 1150 and/or imaging device 1135. User 320 (e.g., or model 325) may thereby remotely control imaging device 1135 (e.g., and robotic assembly 1150) to provide an interactive live stream or broadcast of model 325 (e.g., or user 320), including for example live streaming with first-person controllable mobility.

Figure 12A:
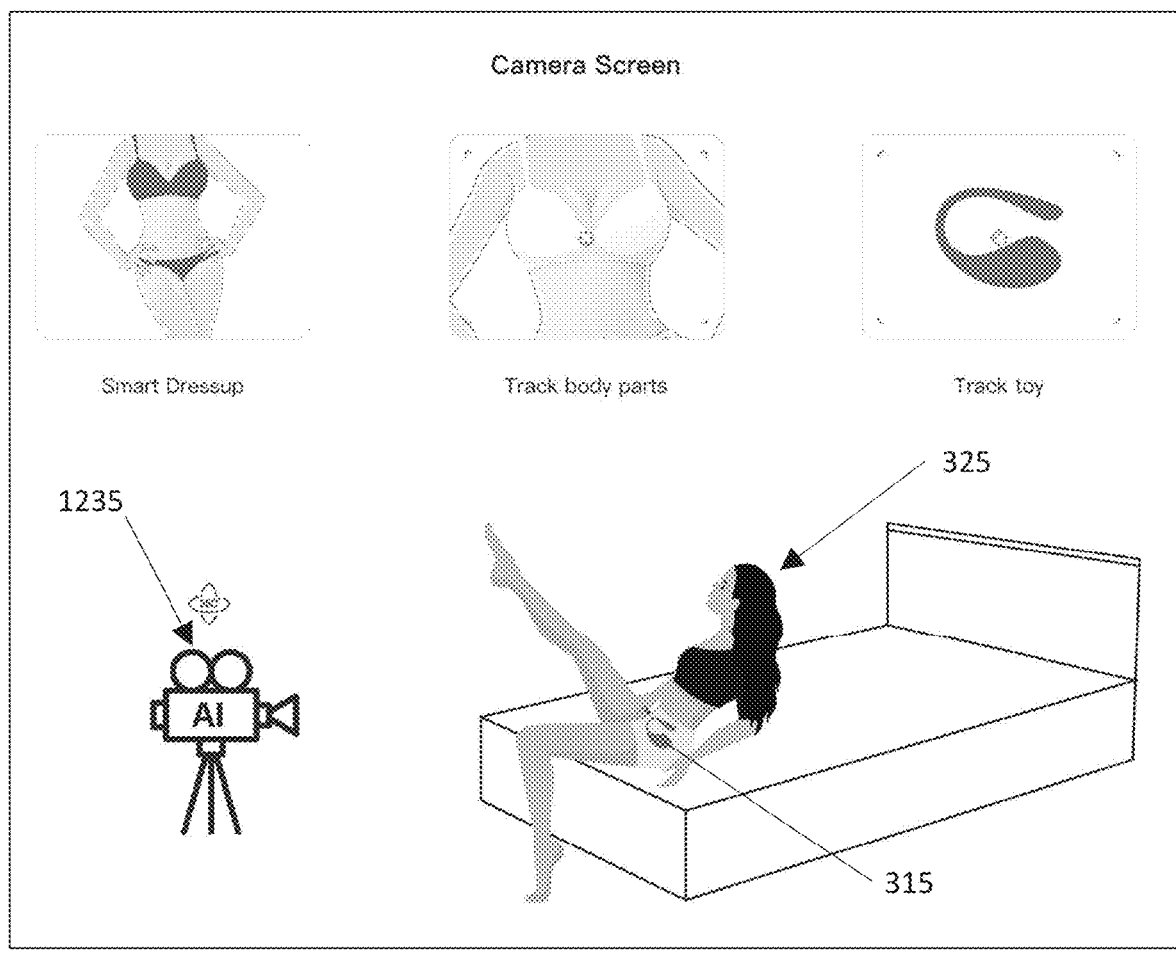
FIG. 12A is a schematic illustration of an exemplary system of the present invention.
Figure 12B:
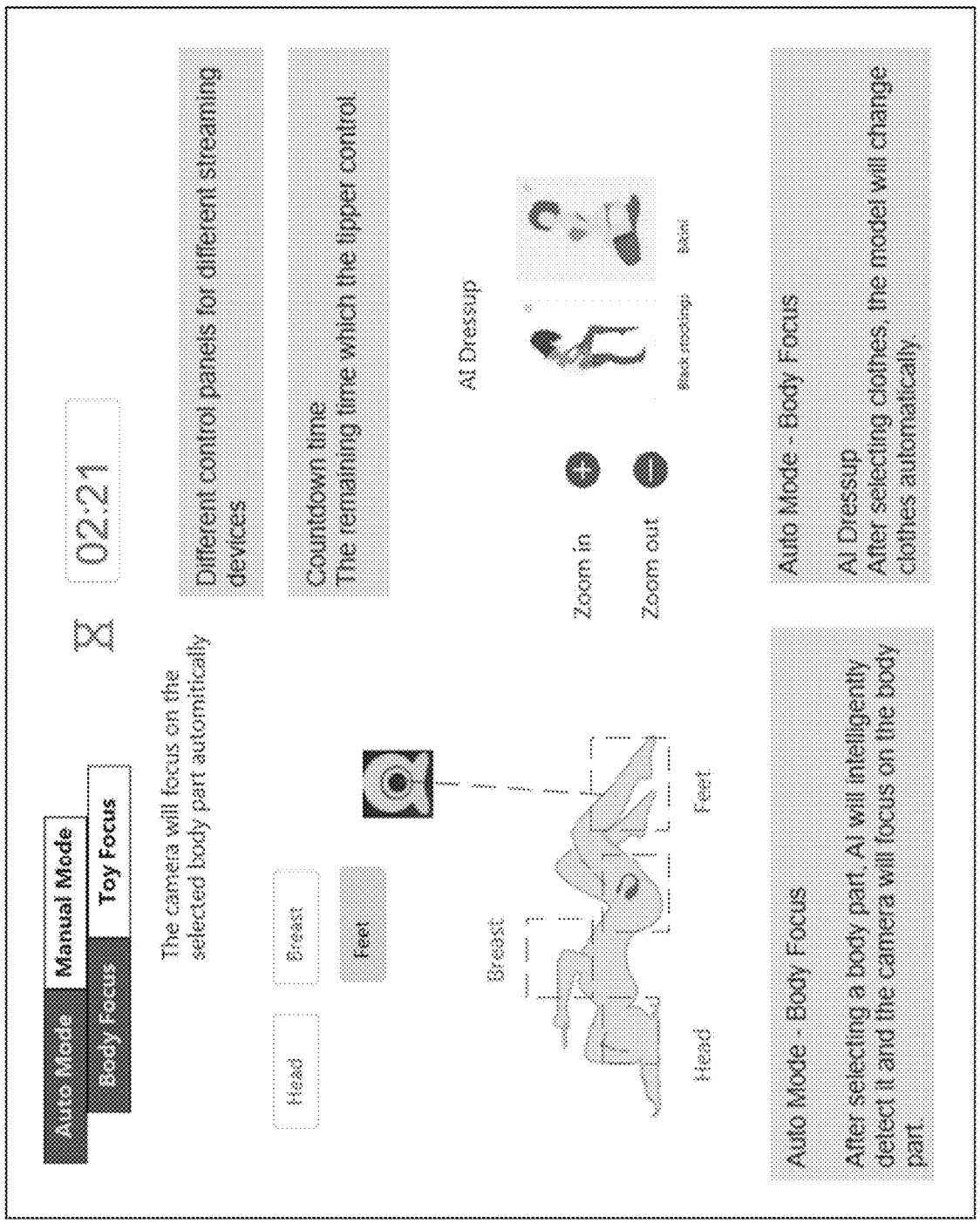
FIG. 12B is a schematic illustration of an exemplary system of the present invention.

FIGS. 12A and 12B illustrate another exemplary embodiment of system 300. As illustrated in FIG. 12A, an imaging device 1235 may be generally similar to imaging device 335. Imaging device 1235 may be located with model 325 (e.g., or user 320) and may record and transfer data (e.g., image, video, audio, thermal, and/or any other desired data) associated with model 325 and/or model accessory 315. For example, imaging device 1235 may be located in a streaming or broadcast location or room of model 325 (e.g., or user 320). Imaging device 1235 may be controlled (e.g., remotely controlled) by model 325 (e.g., and/or user 320) for example as described above. For example, imaging device 1235 may be controlled based on tips provided by a viewer (e.g., user 320) who may view (e.g., view a live data stream or a live broadcast) of a model (e.g., model 325) in real-time or near real-time. A viewer (e.g., user 320) may view model 325 via a display of user device 305. User 320 may remotely control imaging device 1235 imaging model 325 in real-time or near real-time for example as described herein. User 320 may remotely control imaging device 1235 via a graphical user interface (e.g., as illustrated in FIG. 12B) displayed via user device 305 and/or any other suitable technique.

As illustrated in FIG. 12A, imaging device 1235 may be any suitable AI image recognition device. System 300 (e.g., including imaging device 1235) may perform intelligent recognition of user body parts (e.g., of model 325) and/or device shapes (e.g., of model accessory 315) including for example the exemplary disclosed image recognition processes described above. System 300 (e.g., including imaging device 1235) may utilize the exemplary disclosed machine learning operations in combination with the exemplary disclosed image recognition processes. For example, system 300 (e.g., including imaging device 1235) may identify toy shapes, toy colors, and/or other suitable features of model accessory 315 to control imaging device 1235 to zoom in and out and/or track a focus of imaging device 1235 (e.g., where imaging device 1235 focuses, for example on selected body parts of model 325 and/or model accessory 315). In at least some exemplary embodiments, a viewer (e.g., user 320) may provide tips for example as described herein to direct (e.g., help) model 325 to change clothes (e.g., virtual clothes illustrated on an image of model 325) and/or change a background of a room of model 325 (e.g., based on the exemplary disclosed VR processes and streaming).

As illustrated in FIG. 12A, system 300 (e.g., including imaging device 1235) may operate to recognize and follow certain body parts (e.g., feet, genitals, buttocks, breasts, face, or any other body part) and/or accessory (e.g., adult toy such as model accessory 315). System 300 (e.g., including imaging device 1235) may operate utilizing the exemplary disclosed artificial intelligence operations to generate a focus point on a target (e.g., target body part or accessory) and automatically follow the target as the target moves (e.g., when imaging device 1235 is activated).

A graphical user interface (e.g., as illustrated in FIG. 12B) and/or a live data stream (e.g., a live stream or broadcast including images, video, and/or audio) of model 325 (e.g., and model accessory 315) may be displayed to user 320 in real-time or near real-time via user device 305. User 320 may remotely control imaging device 1235 via the exemplary disclosed user interface (e.g., as illustrated in FIG. 12B). For example as illustrated in the exemplary user interface of FIG. 12B, user 320 may set a mode to auto mode or manual mode, set a focus (e.g., image recognition focus) to a body part of model 325 or an accessory (e.g., model accessory 315) for automatic tracking, zoom in or out during activities of model 325 (e.g., dressing), and/or any other desired control. User 320 (e.g., or model 325) may thereby remotely control imaging device 1235 to provide an interactive live stream or broadcast of model 325 (e.g., or user 320), including for example AI image recognition.

In at least some exemplary embodiments, the exemplary disclosed system, apparatus, and method may include the exemplary disclosed imaging device (e.g., a streamer camera) that may be a single camera or a set of cameras. System 300 may provide for switching from a first camera (e.g., first camera or "A") to a second camera (e.g., second camera or "B") among the set of cameras. For example as illustrated in FIGS. 10A and 10B, 4D real-time or near real-time panoramic shooting angle adjustment may be provided by configuring a set of cameras in a certain arrangement (e.g., and/or implementing an instant frames technology as illustrated in FIGS. 9A-9C). The exemplary disclosed imaging device (e.g., streamer camera) may include a web-cam, a PTZ camera, a binocular camera, a 180/360 degree camera (e.g., for VR broadcasting for example as illustrated in FIGS. 11A and 11B), and/or a vision algorithm camera (e.g., used in image identifying, tracking, and/or positioning and/or AI dressing for example as illustrated in FIGS. 12A and 12B), or a combination thereof.

In at least some exemplary embodiments, the exemplary disclosed system, apparatus, and method may include a control module that may be associated with the exemplary disclosed imaging device (e.g., a streamer camera) as built-in or peripheral (e.g., may be associated by any suitable technique such as physical connecting, communication and/or control signaling between processors, the exemplary disclosed modules, and/or any other suitable technique). The streamer camera may be a smart camera having a built-in chip for AI calculation (e.g., as described regarding FIGS. 10A and 10B and 12A and 12B). The streamer camera may have a built-in RFID receiver (e.g., as described regarding FIGS. 9A-9C). An external chip module may be built in a rotatory or moving chassis applicable for cameras and/or pulleys on a track or railway (e.g., as described regarding FIGS. 8A and 8B). The streamer camera may be associated with a moving robot and/or robotic arm and/or sex machine and/or VR camera (e.g., as described regarding FIGS. 11A and 11B).

In at least some exemplary embodiments, the exemplary disclosed system, apparatus, and method may provide for one or more input operations including a tipping operation, an entering operation (e.g., input-entering operation), or combinations thereof. The operations may include mouse and/or keyboard operations, VR operations (e.g., VR handling, eyeball movement, and/or iris identification), controller operation, adult toy operations (e.g., including actuating buttons or utilizing sensors disposed at the sex toy), touch operation (e.g., control panel and/or GUI), vocal operation by a user, gesture operation by a user, neural operation by a user, and/or any other suitable data input operations.

In at least some exemplary embodiments, the exemplary disclosed system, apparatus, and method may provide direct control for one or more camera functions to a viewer device (e.g., user device 305). System 300 may operate to provide a control panel (e.g., GUI) on the viewer device's user interface (e.g., user device 305), and/or may receive any suitable entering operations (e.g., input-entering operations for example as described herein) and map them to the control instructions of the exemplary disclosed imaging device.

In at least some exemplary embodiments, the exemplary disclosed system, apparatus, and method may include a streamer accessory including a signal transmitting module. The streamer accessory may include a streamer's sex toy such as model accessory 315, clothes of model 325, and/or any desired personal belongings of model 325. The signal transmitting module may be included in the exemplary disclosed modules and may include a UWD module, a Bluetooth module, an RFID module, an ultra-wave module, and/or any suitable module that may process and/or transmit a direction-detectable signal.

In at least some exemplary embodiments, the exemplary disclosed system, apparatus, and method may control a streamer accessory such as model accessory 315 to transmit a signal periodically. Periodically transmitting the signal may include sending the signal every minute and/or having a technical effect or feature of avoiding picture flutter (e.g., on a display of user device 305) due to continuous camera positioning and/or tracking.

In at least some exemplary embodiments, the exemplary disclosed system, apparatus, and method may include a streamer camera, a streamer sex toy, and a moving apparatus that are configured to be integrated with each other and further configured to, in response to further instructions from the one or more viewer devices, control the streamer sex toy to perform one or more predetermined actions. For example, robotic assembly 1150 and imaging device 1135 may together comprise (e.g., as a "sex machine pro") a sex machine (e.g., an actuated assembly including an actuatable adult toy), a camera, and a moving part (e.g., an assembly including an actuator). The "sex machine pro" may be movable and may be remotely controllable by any desired user (e.g., user 320 for example based on tipping and/or model 325) and may capture 2D or VR video. The "sex machine pro" may intelligently locate (e.g., through image processing and image recognition for example as described herein) the position of a user's body part (e.g., genitals), and then automatically actuate and/or move (e.g., lift, lower, and/or tilt) the sex toy to aim at a desired body part based on the image recognition at a desired angle. The "sex machine pro" may perform predetermined actions (e.g., vibrate, rotate, reciprocate, heating, and/or any other desired action) and may be remotely controlled to spray fluid (e.g., ejaculate or moisturize), for example including an electronic trigger and/or an air-pumped reservoir pre-loaded with fluid (e.g., liquid such as water or cream).

In at least some exemplary embodiments, by tipping a streamer or a broadcasting model (e.g., model 325), a viewer (e.g., user 320) may remotely control the exemplary disclosed model accessory (e.g., model accessory 315 such as an adult toy or the exemplary disclosed sex machine pro) to eject fluid and/or moisturize using fluid. For example, the model accessory may be a phallus-shaped sex toy with an opening on a distal end thereof. A reservoir that is fillable (e.g., replenishable) with fluid may be fixed to or removably installed with the adult toy such as a phallus-shaped sex toy (e.g., at another distal end thereof). To mimic an ejaculation, there may be a passage (e.g., a flexible conducting pipe) disposed inside for transferring (e.g., pumping) the fluid from the reservoir to the opening. The passage may be disposed in fluid communication with a motor, a compressor, an air pump, and/or any other suitable device that may be electronically and/or remotely triggered to actuate to transfer the fluid from the reservoir to the opening.

In at least some exemplary embodiments, after one or more viewers (e.g., users 320) send tips to the model (e.g., utilizing a broadcast platform), system 300 (e.g., including the exemplary disclosed adult toy such as model accessory 315) may output (e.g., deliver) a prompt to the model (e.g., model 325) before the adult toy begins ejection and/or moisturization. For example, the prompt may be provided as a vibration, a sound, an illumination, and/or any other desired prompt that may be pre-defined by the model and/or by system 300. In a scenario where the prompt is provided as a vibration, the adult toy may be used to sexually stimulate the model in a first control pattern as an operational mode; when receiving an input (e.g., a particular amount of tipping tokens) from the viewer(s), the adult toy may be actuated to sexually stimulate the model in a second control pattern different from the first control pattern as a prompt mode before squirting. The prompt may be provided by the exemplary disclosed adult toy and/or user device. The prompt may be used to remind the model (e.g., model 325) of an action (e.g., an impending or about-to-execute action) such as ejection and/or moisturization of the adult toy. For example, when the prompt is provided (e.g., delivered), the model may move the adult toy (e.g., take the adult toy away from or out of his or her body, and show the adult toy in front of the exemplary disclosed imaging device such as a webcam to viewers). Also for example, the model may use the adult toy to eject toward and/or moisturize other parts of his or her body (e.g., in a timely manner in view of a broadcast activity such as a performance). Further for example, the viewer may decide when an adult toy starts ejection and/or moisturization. Also for example, ejection of fluid may be executed immediately. For example, the exemplary disclosed adult toy may eject immediately (e.g., at once) as soon as receiving tips or commands from one or more viewers (e.g., users 320). Also for example, the viewer may set a starting time of ejection (e.g., after a certain duration, in response to meeting a certain condition, and/or based on any other suitable criteria). Further for example, when the adult toy on the model's side (e.g., model accessory 315) of the broadcast is actuated to eject fluid, an animation (e.g., a video, GIF, and/or other suitable animation) imitating this ejection procedure may be displayed on a user interface of the viewer's device (e.g., user device 305), which may also be displaying broadcast content streamed by the model device (e.g., model device 315) at the same time.

In at least some exemplary embodiments, a first adult toy associated with (e.g., correlating to) a model (e.g., model accessory 315 of model 325) that may be remotely controlled to eject and/or moisturize, and a second adult toy associated with (e.g., correlating to) a viewer (e.g., viewer accessory 308 of user 320) may both be configured with a separate sensing system. For example, when the second adult toy detects with its sensing system that the viewer ejaculates using the second adult toy (e.g., viewer accessory 308), a sensing signal may be generated and transmitted to the first adult toy (e.g., directly, via the viewer device, and/or the model device). Responsive to receiving the sensing signal at the side of model (e.g., via model device 310 and/or model accessory 315) of a broadcast, the first adult toy (e.g., model accessory 315) may be actuated to eject fluid that is pre-loaded by the model to the reservoir of the first adult toy. In another example, the first adult toy (e.g., model accessory 315) may sense changes in physiological characteristics from the model (e.g., human being such as model 325) using its sensing system, such that the first adult toy may be controlled (e.g., actuated) to eject fluid when the sensed changes meet or exceed a predetermined threshold. For example, the physiological characteristics may include decibel of screaming of the model, frequency of muscle spasm of the model, body temperature of the model, and/or any suitable biometric or sensed characteristics of the model (e.g., human being such as model 325).

In at least some exemplary embodiments, based on one or more ranges of tip amounts, the model (e.g., model 325) may customize different patterns to remotely control an ejection and/or moisturization of the model's sex toy (e.g., model accessory 315). Patterns may include any suitable parameters regarding ejection and/or moisturization such as, for example, fluid temperature, intensity of ejection, frequency of ejection, cross-sectional area of ejection, total ejection time, and/or any other desired parameters. The model may pre-define different ranges of tip amounts corresponding to different parameters. For example, tipping one to ten tokens may correspond to levels 1 to 10 of ejection intensity, respectively. Also for example, tipping eleven to twenty tokens may correspond to levels 1 to 10 of ejection flow, respectively. The exemplary disclosed pattern may also be created by a viewer (e.g., user 320) and stored correlating to multimedia platform by system 300. Also for example, a viewer may use other patterns provided by system 300 (e.g., recommended based on algorithms and/or machine learning operations of system 300 for example as described herein) and/or shared by other viewers (e.g., other users 320). Based on the exemplary disclosed motor and/or passage (e.g., an adaptive conductive pipe) disposed in or configured for the exemplary disclosed adult toy, any desired types of fluid (e.g., water, liquid, cream, artificial saliva, lubricant, and/or artificial urine) may be actuated and/or pumped to eject from an opening of the exemplary disclosed adult toy. The opening from which the liquid is squirted may include but not limited to a nozzle, an inner bore, or a rolling ball of the sex toy. In one example, a size of the opening is adjustable. In another example, a house of the adult toy is transparent, such that an internal squirting system including the fluid and the pipe can be seen from the outside.

In at least some exemplary embodiments, the exemplary disclosed system, apparatus, and method may, in response to a control instruction including a dressing command, intelligently dress a streamer (e.g., model 325) with customized virtual clothes for example on a display to a user or in a VR environment. The dressing command may be based for example on a tipping operation, selecting operation, and/or selected after a tip is provided. The virtual clothes may be put on the streamer (e.g., in the VR environment or on a display to a viewer) and may follow the streamer as the streamer moves around.

In at least some exemplary embodiments, users such as viewers (e.g., user 320) may gesture to users such as models (e.g., model 325) via the exemplary disclosed operation of system 300. For example, users may utilize gesture identifying using system 300 as described herein. The viewers may make and send (e.g., transfer image data of) a gesture mimic instruction via their exemplary disclosed UI (e.g., user device 305) to the model. The model may perform an imitation of the gesture. The gesture may be any desired gesture such as, for example, making and/or drawing (e.g., using the UI) or selecting a particular pose of the whole body, a gesture of a given body part (e.g., a hand gesture), and/or any other desired gesture. System 300 (e.g., including the exemplary disclosed imaging device) may recognize (e.g., using the exemplary disclosed image recognition techniques) and compare (e.g., based on the exemplary disclosed algorithms, processes, and/or artificial intelligence operations) a model's actual gesture imitation with the viewer's gesture instruction. If the comparison results in a match, system 300 may operate to reward the model (e.g., the model may receive a reward for that tip operation). If the comparison does not result in a match, a tip may be returned by system 300 to the viewer.

The exemplary disclosed system, apparatus, and method may be used in any suitable telecommunications application. The exemplary disclosed system, apparatus, and method may be used in any suitable application for controlling an imaging device such as a camera during broadcasting of content. The exemplary disclosed system, apparatus, and method may be used in any suitable application for broadcasting of adult content. For example, the exemplary disclosed system, apparatus, and method may be used in any suitable application for providing adult entertainment. The exemplary disclosed system, apparatus, and method may be used in any suitable telecommunication application for adult entertainment.

Figure 13:
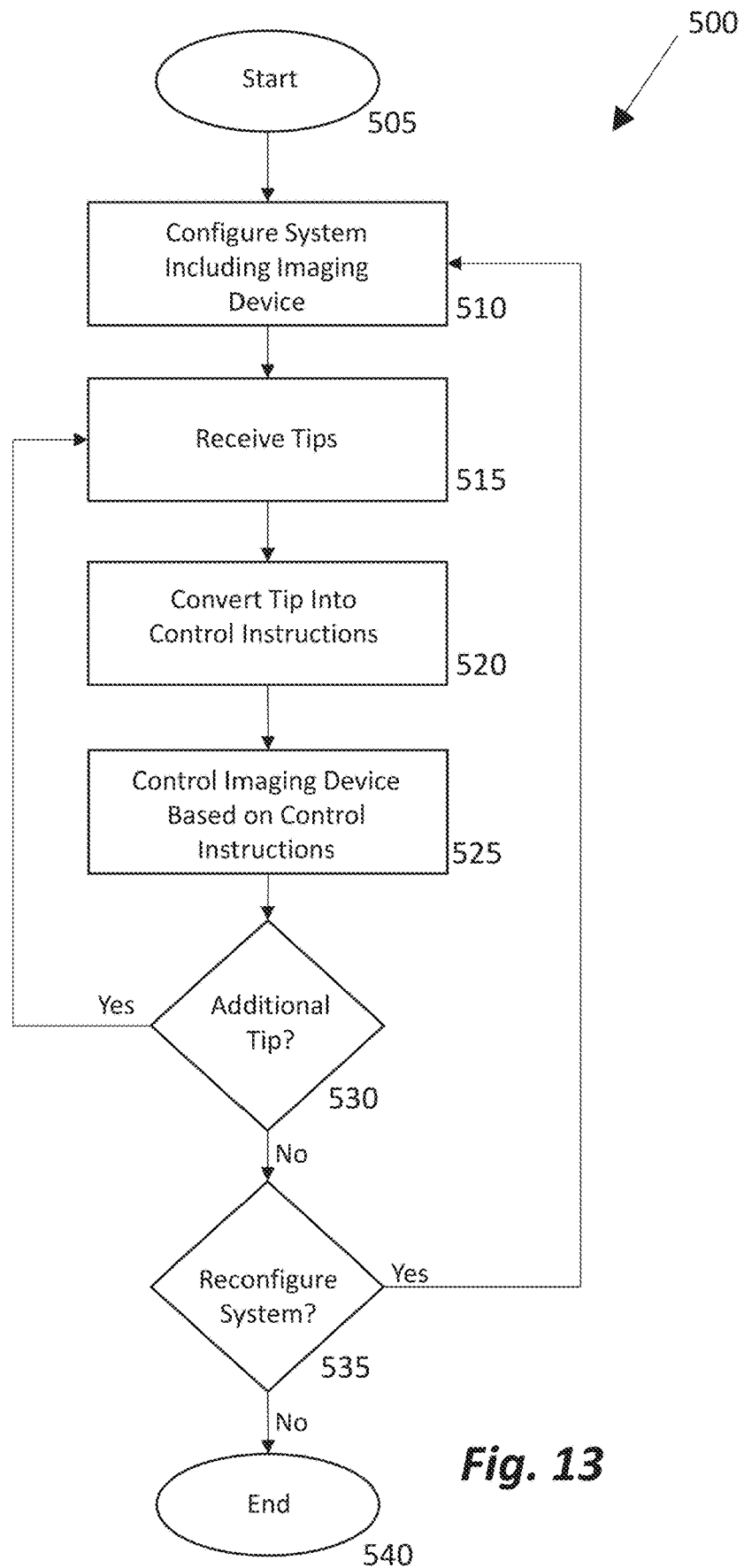
FIG. 13 is a flowchart showing an exemplary process of the present invention.

An exemplary operation of the exemplary disclosed system, apparatus, and method will now be described. For example, FIG. 13 illustrates an exemplary process 500 of system 300. Process 500 begins at step 505.

At step 510, system 300 may be configured. For example, system 300 may be configured as illustrated in FIGS. 1, 2, 8A and 8B, 9A-9C, 10A and 10B, 11A and 11B, 12A and 12B, or with any other suitable configuration. Any desired number and arrangement of user devices 305, accessories 308, model devices 310, accessories 315, and/or imaging devices (e.g., imaging devices 335, 835, 935, 1035, 1135, and/or 1235 and/or user devices) may be provided in system 300. System 300 may sense and transfer data, process data, and control the exemplary disclosed imaging device (e.g., imaging devices 335, 835, 935, 1035, 1135, and/or 1235) in real-time or in near real-time. The exemplary disclosed imaging device (e.g., imaging devices 335, 835, 935, 1035, 1135, and/or 1235) may be configured to receive data and signals from other components of system 300 for example as described herein. The exemplary disclosed module, storage (e.g., storage buffer), and hardware may include a memory having stored thereon instructions, a processor configured to execute the instructions resulting in a software application, and a software application configured to perform process 500.

In at least some exemplary embodiments at step 510, user 320 may install an application of system 300 on user device 305 (e.g., and/or model 325 may install the application on model device 310). User 320 (e.g., and/or model 325) may authorize the application to access the data of sensor array 306 (e.g., an acceleration sensor and a GPS) of user device 305 (e.g., and/or model device 310). User 320 (e.g., and/or model 325) may also authorize the application to access the data of Bluetooth or any other suitable communication components of user device 305 (e.g., and/or model device 310). Model 325 (e.g., and/or user 320) may also connect accessory 315 to model device 310 (e.g., and/or user device 305) via Bluetooth or any other suitable communication technique. The exemplary disclosed imaging device (e.g., imaging devices 335, 835, 935, 1035, 1135, and/or 1235) may be connected to components of system 300 for example as described herein.

At step 515, system 300 may operate to receive input data such as tips. One or more users 320 (e.g., and/or or models 325) may provide tips using system 300 for example as described herein. For example, users 320 (e.g., and/or or models 325) may provide tips by any suitable technique (e.g., tipping technique or input technique) using any suitable devices (e.g., user devices 305 and/or model devices 310) for example as described herein.

At step 520, system 300 may operate to convert the tips provided at step 515 into control instructions for example as described herein. System 300 may control the exemplary disclosed imaging device (e.g., imaging devices 335, 835, 935, 1035, 1135, and/or 1235) based on an amount of a user tip (e.g., provided by user 320 via user device 305) for example including converting different amounts of viewer tips into different camera control instructions. Different tipping ranges may correspond to different camera control instructions provided via the exemplary disclosed user interface (e.g., user device 305) for example as described herein. In at least some exemplary embodiments, if a tip falls within one or more predetermined ranges, system 300 may control the exemplary disclosed imaging device (e.g., imaging devices 335, 835, 935, 1035, 1135, and/or 1235) to operate or move at predefined ranges or thresholds (e.g., of rotation, movement, zooming, or any other desired parameters) for example as described herein based on the one or more predetermined ranges.

At step 525, system 300 may operate to control the exemplary disclosed imaging device (e.g., imaging devices 335, 835, 935, 1035, 1135, and/or 1235) based on the control instructions determined at step 520, including for example the predefined ranges or thresholds described above. System 300 may control the exemplary disclosed imaging device (e.g., imaging devices 335, 835, 935, 1035, 1135, and/or 1235) for example as described above regarding FIGS. 8A and 8B, 9A-9C, 10A and 10B, 11A and 11B, and/or 12A and 12B.

At step 530, system 300 may determine whether or not additional tips have been provided by users (e.g., users 320). If additional tips have been provided, system 300 may return to step 515. System 300 may repeat steps 515 through 530 for any desired number of iterations. If additional tips are not to be provided, system 300 may proceed to step 535.

At step 535, system 300 may determine whether or not system 300 is to be reconfigured based on, for example, input provided by user 320, a predetermined operation or algorithm of the exemplary disclosed module, and/or any other suitable criteria. If system 300 is to be reconfigured, system 300 may return to step 510. System 300 may repeat steps 510 through 535 for any desired number of iterations. If system 300 is not to be reconfigured, system 300 may proceed to step 540, at which process 500 ends.

In at least some exemplary embodiments, the exemplary disclosed system may include an imaging device (e.g., imaging device 335, 835, 935, 1035, 1135, or 1235) configured to obtain broadcast content of a streamer, one or more viewer devices (e.g., user device 305) configured to directly or indirectly control the imaging device, a streamer device (e.g., model device 310) configured to stream the broadcast content to the one or more viewer devices, a control module associated with the imaging device, the control module configured to communicate with the streamer device or the one or more viewer devices, and the control module comprising computer-executable code stored in non-volatile memory, and a processor. The imaging device, the one or more viewer devices, the streamer device, the control module, and the processor may be configured to receive one or more input data from the one or more viewer devices, convert the one or more input data into one or more control instructions, and in response to the one or more control instructions, use the control module to control the imaging device to perform one or more imaging functions. The imaging device, the one or more viewer devices, the streamer device, the control module, and the processor may be configured to update and stream the broadcast content of the controlled imaging device to the one or more viewer devices based on the one or more viewer devices transferring a predetermined amount of tips. The one or more imaging functions may include at least one selected from the group of camera rotation, camera displacement, camera switch, panoramic angle adjustment, camera positioning, camera tracking, camera zooming, camera parameter setting, image identifying, image processing, and combinations thereof. The imaging device may be a single camera or a set of cameras. A type of the imaging device may include at least one selected from the group of a web-cam, a PTZ camera, a binocular camera, a 180/360 degree camera, a vision algorithm camera, and combinations thereof. The control module may be associated with the imaging device as either a built-in configuration or a peripheral configuration. The one or more input data may include at least one selected from the group of a tipping operation, an entering operation, and combinations thereof. When the one or more input data excludes a tipping operation, then the imaging device, the streamer device, the control module, and the one or more viewer devices may be further configured to before receiving the one or more input data from the one or more viewer devices, receive a tip from the one or more viewer devices, in response to receiving the tip from the one or more viewer devices, determine whether a value of the tip meets a threshold range, and if the tip meets the threshold range, provide a direct control for the one or more imaging functions to the one or more viewer devices. When the one or more input data includes a tipping operation, then the imaging device, the streamer device, the control module, and the one or more viewer devices may be further configured to in response to the tipping operation from the one or more viewer devices, determine whether a value of the tipping operation falls within one of a plurality of threshold ranges, wherein the plurality of threshold ranges correspond to the one or more control instructions, and if the value of the tipping operation falls within the one of the plurality of threshold ranges, convert the tipping operation into a control instruction of the one or more control instructions corresponding to the one of the plurality of threshold ranges. The exemplary disclosed system may also include a first moving apparatus used by the control module to control the imaging device to move. The first moving apparatus, the imaging device, the streamer device, the control module, and the one or more viewer devices may be further configured to in response to the one or more control instructions including a first moving command, use the control module to instruct the first moving apparatus to perform camera rotation or camera displacement of the imaging device. The imaging device is a set of cameras, and the set of cameras, the streamer device, the control module, and the one or more viewer devices may be further configured to in response to the one or more control instructions including a switching command, instruct the control module to switch a first broadcast content obtained by a first camera of the set of cameras to a second broadcast content obtained by a second camera of the set of cameras. The imaging device may be a set of cameras, and the set of cameras, the streamer device, the control module, and the one or more viewer devices may be further configured to set the set of cameras in a particular arrangement, obtain multiple broadcast contents using the set of cameras, seamlessly combine the multiple broadcast contents and generate a 4D broadcast content, and in response to the one or more control instructions including a panoramic angle adjusting command, instruct the control module to instantaneously adjust different panoramic angles of the 4D broadcast content. The exemplary disclosed system may further include a streamer accessory including a signal transmitting module. The streamer accessory, the imaging device, the streamer device, the control module, and the one or more viewer devices may be further configured to in response to the one or more control instructions including at least one of a positioning command or a tracking command, use the control module to control the imaging device to perform at least one of a camera positioning function or a camera tracking function by detecting a signal transmitted by the signal transmitting module. Using the control module to control the imaging device to perform the at least one of the camera positioning function or the camera tracking function by detecting the signal transmitted by the signal transmitting module may include controlling the streamer accessory to transmit the signal periodically, and when the signal is detected, controlling the imaging device to rotate or to displace to aim at a source of the signal and obtain broadcast content of the streamer accessory. The exemplary disclosed system may also include a viewer VR apparatus, wherein the imaging device may include a VR camera and may be equipped with a moving apparatus. The viewer VR apparatus, the imaging device, the streamer device, the control module, and the one or more viewer devices may be further configured to in response to the control instruction including a moving command, use the control module to control the moving apparatus to perform camera rotation or camera displacement of the VR camera, and stream VR broadcast content obtained by the VR camera, having a position that is controlled by the one or more viewer devices, to a viewer device of the one or more viewer devices that is configured with the viewer VR apparatus. The exemplary disclosed system may further include a streamer sex toy, wherein the imaging device, the streamer sex toy, and the moving apparatus may be configured to be integrated with each other and further configured to in response to further instruction from the one or more viewer devices, control the streamer sex toy to perform one or more predetermined actions. The imaging device, the streamer device, the control module, and the one or more viewer devices may be further configured to in response to a control instruction of the one or more control instructions including an intelligent recognition command, use the control module to control the imaging device to perform at least one selected from the group of a camera zoom function, a positioning function, a tracking function, image processing, and combinations thereof. An object of the intelligent recognition command may be a body outline or a body part of the streamer or a streamer accessory. Using the control module to control the imaging device to perform at least one selected from the group of the camera zoom function, the positioning function, the tracking function, the image processing, and combinations thereof may include based on an AI algorithm, identifying a position of the object in the broadcast content, controlling the imaging device to aim at the object according to the position of the object, rendering the object with animation effect, and presenting the broadcast content with the rendered object to the one or more viewer devices in real-time or near real-time. Rendering the object with animation effect may include in response to the control instruction of the one or more control instructions including a dressing command, intelligently dressing an image of the streamer up with graphical elements including customized virtual clothes.

In at least some exemplary embodiments, the exemplary disclosed method may include providing an imaging device (e.g., imaging device 335, 835, 935, 1035, 1135, or 1235), obtaining broadcast content of a streamer using the imaging device, directly or indirectly controlling the imaging device using one or more viewer devices (e.g., user device 305), streaming the broadcast content to the one or more viewer devices using a streamer device (e.g., model device 310), receiving one or more input data from the one or more viewer devices, converting the one or more input data into one or more control instructions, and in response to the one or more control instructions, controlling the imaging device to perform one or more imaging functions. The exemplary disclosed method may also include when a plurality of viewers are watching the broadcast content: receiving a tip from a first viewer of the plurality of viewers to control the imaging device; transferring the broadcast content of the controlled imaging device to other tipping viewers of the plurality of viewers, the other tipping viewers providing tips; blocking the broadcast content from non-tipping viewers of the plurality of viewers and instead transferring a second content (e.g., a model's ordinary camera stream and/or image such as a still image of the model) to the non-tipping viewers; and when multiple viewers of the plurality of viewers tip at a same time setting a queue for the multiple viewers to control the imaging device one after the other, each for a certain time, or setting a time window for receiving tips, with the highest tipper of the multiple viewers receiving control of the imaging device.

In at least some exemplary embodiments, the exemplary disclosed system may include a streamer camera (e.g., imaging device 335, 835, 935, 1035, 1135, or 1235) configured to obtain broadcast content of a streamer, one or more viewer devices (e.g., user device 305) configured to directly or indirectly control the streamer camera, a streamer device (e.g., model device 310) configured to stream the broadcast content to the one or more viewer devices, a control module associated with the streamer camera, the control module configured to communicate with the streamer device or the one or more viewer devices, and the control module comprising computer-executable code stored in non-volatile readable medium, and a processor. The streamer camera, the one or more viewer devices, the streamer device, the control module, and the processor may be configured to receive one or more input data from the one or more viewer devices, convert the one or more input data into one or more control instructions, and in response to the one or more control instructions, use the control module to control the streamer camera to perform one or more camera functions. The one or more viewer devices may include a first user interface configured to display the broadcast content and a second user interface configured to display a live broadcast obtained by an additional camera. The second user interface may be aligned with the first user interface. The second user interface may operate as a "picture-in-picture" for the first user interface. The additional camera may be a webcam for live-streaming or a micro-camera configured for endoscopy streaming, the micro-camera built into an adult toy of the streamer.

The exemplary disclosed system, apparatus, and method may provide an efficient and effective technique for controlling imaging devices. For example, the exemplary disclosed system, apparatus, and method may efficiently and effectively control imaging devices during broadcast of content such as live broadcasts. In at least some exemplary embodiments, the exemplary disclosed system, apparatus, and method may allow for control of an imaging device to increase enjoyment of broadcasted entertainment for viewers.

In at least some exemplary embodiments, the exemplary disclosed system, apparatus, and method may utilize sophisticated machine learning and/or artificial intelligence techniques to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary neural network may include a plurality of input nodes that may be interconnected and/or networked with a plurality of additional and/or other processing nodes to determine a predicted result. Exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. The exemplary disclosed system may utilize prediction algorithms and approach that may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets.

Figure 14:
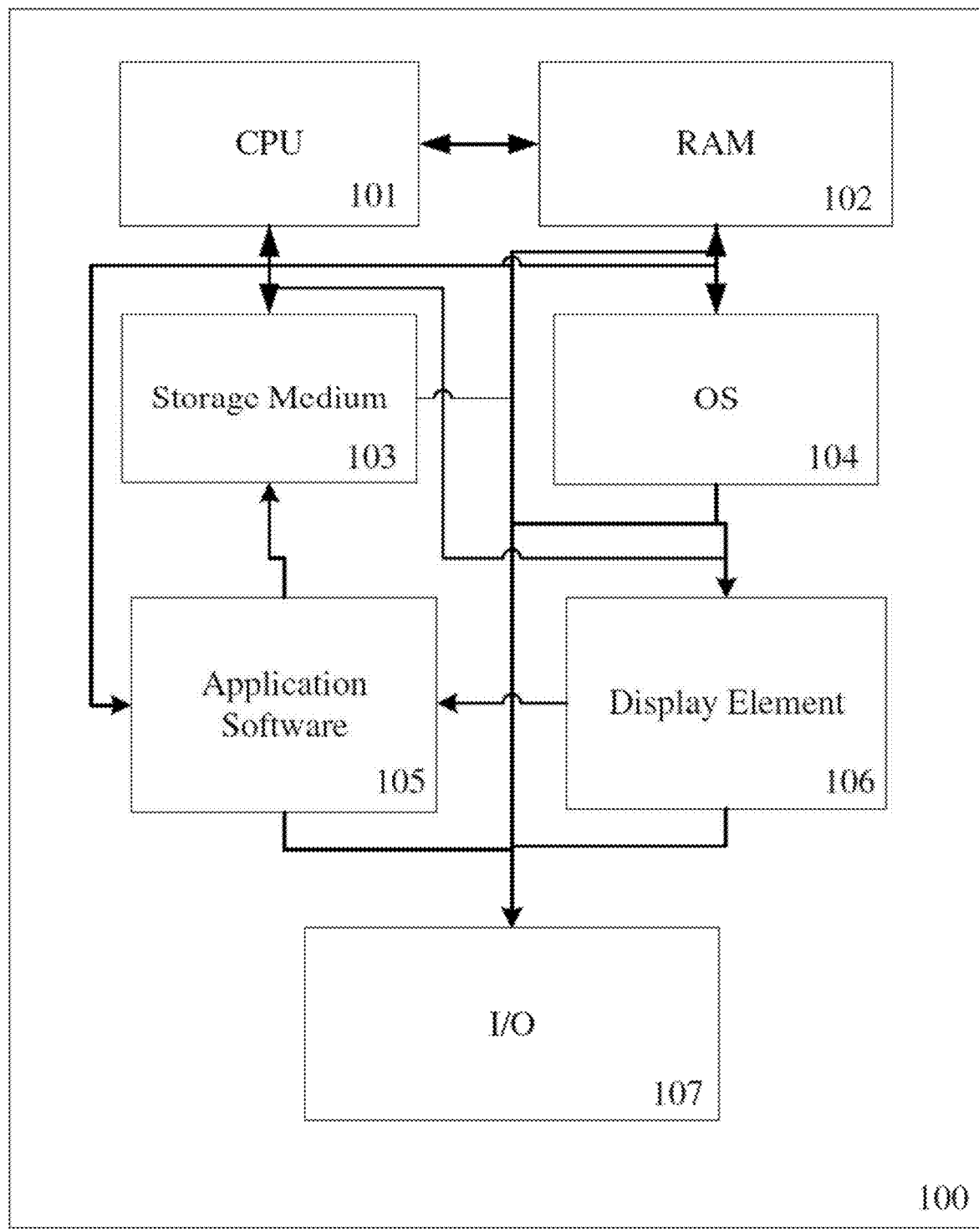
FIG. 14 is a schematic illustration of an exemplary computing device, in accordance with at least some exemplary embodiments of the present disclosure.

An illustrative representation of a computing device appropriate for use with embodiments of the system of the present disclosure is shown in FIG. 14. The computing device 100 can generally be comprised of a Central Processing Unit (CPU, 101), optional further processing units including a graphics processing unit (GPU), a Random Access Memory (RAM, 102), a mother board 103, or alternatively/additionally a storage medium (e.g., hard disk drive, solid state drive, flash memory, cloud storage), an operating system (OS, 104), one or more application software 105, a display element 106, and one or more input/output devices/means 107, including one or more communication interfaces (e.g., RS232, Ethernet, Wifi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 15, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 15:
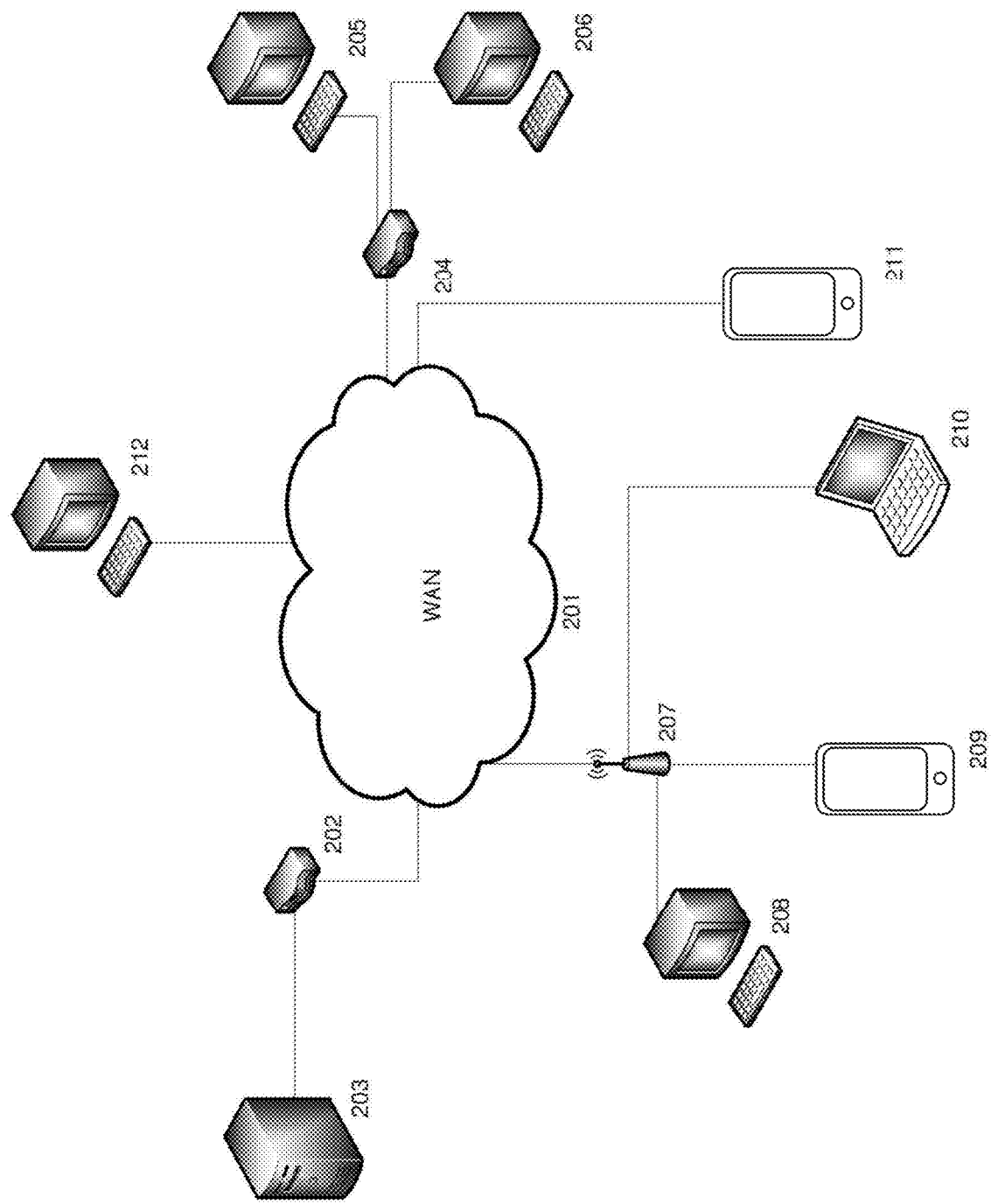
FIG. 15 is a schematic illustration of an exemplary network, in accordance with at least some exemplary embodiments of the present disclosure.

Referring to FIG. 15, a schematic overview of a system in accordance with an embodiment of the present disclosure is shown. The system is comprised of one or more application servers 203 for electronically storing information used by the system. Applications in the server 203 may retrieve and manipulate information in storage devices and exchange information through a WAN 201 (e.g., the Internet). Applications in server 203 may also be used to manipulate information stored remotely and process and analyze data stored remotely across a WAN 201 (e.g., the Internet).

According to an exemplary embodiment, as shown in FIG. 15, exchange of information through the WAN 201 or other network may occur through one or more high speed connections. In some cases, high speed connections may be over-the-air (OTA), passed through networked systems, directly connected to one or more WANs 201 or directed through one or more routers 202. Router(s) 202 are completely optional and other embodiments in accordance with the present disclosure may or may not utilize one or more routers 202. One of ordinary skill in the art would appreciate that there are numerous ways server 203 may connect to WAN 201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 203 via WAN 201 or other network in numerous ways. For instance, a component or module may connect to the system i) through a computing device 212 directly connected to the WAN 201, ii) through a computing device 205, 206 connected to the WAN 201 through a routing device 204, iii) through a computing device 208, 209, 210 connected to a wireless access point 207 or iv) through a computing device 211 via a wireless connection (e.g., CDMA, GMS, 3G, 4G) to the WAN 201. One of ordinary skill in the art will appreciate that there are numerous ways that a component or module may connect to server 203 via WAN 201 or other network, and embodiments of the present disclosure are contemplated for use with any method for connecting to server 203 via WAN 201 or other network. Furthermore, server 203 could be comprised of a personal computing device, such as a smartphone, acting as a host for other computing devices to connect to.

The communications means of the system may be any means for communicating data, including image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on-any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. A method, comprising:
receiving input data from one or more viewer apparatuses during a first broadcast content of a model user being streamed to the one or more viewer apparatuses from a model apparatus of the model user, the input data being configured to indirectly control a robotic assembly which is locally communicably coupled with the model apparatus and which comprises a moving component, a haptic stimulating component, and an imaging device;
converting the input data into one or more control instructions; and
based on the one or more control instructions, controlling the moving component to perform one or more moving actions and controlling the haptic stimulating component to perform one or more haptic stimulating actions, the one or more moving actions being configured to move the robotic assembly closer to or away from the model user, and the one or more haptic stimulating actions being configured to haptically stimulate the model user,
wherein:
the one or more moving actions and the one or more haptic stimulating actions are captured and presented in the first broadcast content, and
the method further comprises, in response to a tipping operation from a tipping viewer being included in the received input data:
activating, based on the tipping operation, the imaging device of the robotic assembly to capture a second broadcast content, the second broadcast content being streamed to the tipping viewer.

2. The method of claim 1, wherein the input data includes at least one of the tipping operation and an entering operation.

3. The method of claim 2, wherein:
the input data includes the tipping operation, and
the converting the input data into the one or more control instructions includes:
determining whether a value of the tip meets one of a plurality of threshold ranges, each of the plurality of threshold ranges corresponding to a respective one of the one or more control instructions; and
converting the input data into a control instruction of the one or more control instructions corresponding to the one of the plurality of threshold ranges.

4. The method of claim 1, wherein the imaging device is configured to perform one or more imaging functions in response to the input data from the one or more viewer apparatuses.

5. The method of claim 4, wherein the one or more imaging functions include at least one of camera rotation, camera displacement, camera switch, panoramic angle adjustment, camera positioning, camera tracking, camera zooming, camera parameter setting, image identifying, image processing, and combinations thereof.

6. The method of claim 1, wherein the imaging device includes one or more cameras.

7. The method of claim 1, wherein the one or more moving actions comprise at least one of moving, rotation, lift, lower, tilt and combinations thereof.

8. The method of claim 1, wherein each of the one or more viewer apparatuses comprises a user interface and is in communication with the robotic assembly.

9. The method of claim 8, wherein:
the input data is an entering operation,
the method further comprises providing at least one control panel on the user interface, and
the at least one control panel is configured to receive the entering operation from the one or more viewer apparatuses.

10. The method of claim 9, further comprising:
displaying one or more control buttons on the at least one control panel,
wherein a first control button of the at least one control panel is configured to control a direction of the moving component, and a second control button of the at least one control panel is configured to control a speed of the haptic stimulating component.

11. A system, comprising:
a memory storing executable instructions; and
a processor operatively coupled with the memory, the processor being configured to execute the executable instructions to control the system to perform operations comprising:
receiving input data from one or more viewer apparatuses during a first broadcast content of a model user being streamed to the one or more viewer apparatuses from a model apparatus of the model user, the input data being configured to indirectly control a robotic assembly which is locally communicably coupled with the model apparatus and which comprises a moving component, a haptic stimulating component, and an imaging device;
converting the input data into one or more control instructions; and
based on the one or more control instructions, controlling the moving component to perform one or more moving actions and controlling the haptic stimulating component to perform one or more haptic stimulating actions, the one or more moving actions being configured to move the robotic assembly closer to or away from the model user, and the one or more haptic stimulating actions being configured to haptically stimulate the model user,
wherein:
the one or more the moving actions and the one or more haptic stimulating actions are captured and presented in the first broadcast content, and
the operations further comprise, in response to a tipping operation from a tipping viewer being included in the received input data:
activating, based on the tipping operation, the imaging device of the robotic assembly to capture a second broadcast content, the second broadcast content being streamed to the tipping viewer.

12. The system of claim 11, wherein the input data includes at least one of the tipping operation and an entering operation.

13. The system of claim 11, wherein the imaging device is configured to perform one or more imaging functions in response to the input data from the one or more viewer apparatuses.

14. The system of claim 11, wherein the imaging device includes one or more cameras.

15. The system of claim 11, wherein each of the one or more viewer apparatuses comprises a user interface and is in communication with the robotic assembly.

16. The system of claim 15, wherein:
the input data is an entering operation,
at least one control panel is provided on the user interface, and
the at least one control panel is configured to receive the entering operation from the one or more viewer apparatuses.

17. The system of claim 16, wherein:
the user device is configured to display one or more control buttons on the at least one control panel, and
a first control button of the at least one control panel is configured to control a direction of the moving component, and a second control button of the at least one control panel is configured to control a speed of the haptic stimulating component.

18. A non-transitory computer-readable storage medium storing machine-readable instructions thereon, the machine-readable instructions, when executed by a processor of a controller, enabling the controller to perform operations comprising:
receiving input data from one or more viewer apparatuses during a first broadcast content of a model user being streamed to the one or more viewer apparatuses from a model apparatus of the model user, the input data being configured to indirectly control a robotic assembly which is locally communicably coupled with the model apparatus and which comprises a moving component, a haptic stimulating component, and an imaging device;
converting the input data into one or more control instructions; and
based on the one or more control instructions, controlling the moving component to perform one or more moving actions and controlling the haptic stimulating component to perform one or more haptic stimulating actions, the one or more moving actions being configured to move the robotic assembly closer to or away from the model user, and the one or more haptic stimulating actions being configured to haptically stimulate the model user,
wherein:
the one or more moving actions and the one or more haptic stimulating actions are captured and presented in the first broadcast content, and
the operations further comprise, in response to a tipping operation from a tipping viewer being included in the received input data:
activating, based on the tipping operation, the imaging device of the robotic assembly to capture a second broadcast content, the second broadcast content being streamed to the tipping viewer.

* * * * *